US010713918B2

(12) United States Patent
Asiri

(10) Patent No.: US 10,713,918 B2
(45) Date of Patent: Jul. 14, 2020

(54) SMART BOAT FOR SWIMMING POOL MAINTENANCE

(71) Applicant: King Abdulaziz University, Jeddah (SA)

(72) Inventor: Saeed Asiri, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

(21) Appl. No.: 16/170,386

(22) Filed: Oct. 25, 2018

(65) Prior Publication Data
US 2020/0135000 A1 Apr. 30, 2020

(51) Int. Cl.
G08G 1/16 (2006.01)
F16P 3/14 (2006.01)
G08B 21/02 (2006.01)
B60Q 9/00 (2006.01)
G08B 3/10 (2006.01)
G08B 21/08 (2006.01)
G08B 21/18 (2006.01)
(Continued)

(52) U.S. Cl.
CPC ............ G08B 21/084 (2013.01); B63B 34/00 (2020.02); C02F 1/008 (2013.01); G05D 1/0206 (2013.01); G08B 21/182 (2013.01); B63B 2035/737 (2013.01); C02F 2103/42 (2013.01); C02F 2209/06 (2013.01); C02F 2209/29 (2013.01); C02F 2303/24 (2013.01)

(58) Field of Classification Search
CPC ... B60Q 9/008; F16P 3/14; F16P 3/145; F16P 3/147; G08B 21/0213; G08B 21/0275; G08B 3/10; G08G 1/166
See application file for complete search history.

(56) References Cited

U.S. PATENT DOCUMENTS 4,016,079 A 4/1977 Severin
4,798,707 A 1/1989 Thomas et al.
(Continued)

FOREIGN PATENT DOCUMENTS

CN 101531410 B 9/2014
CN 105173019 A 12/2015
(Continued)

OTHER PUBLICATIONS

Chainsaw Journal ; Best Automatic Pool Cleaners | The Pool Cleaning Robots are Here ; Chainsaw Journal ; Jan. 11, 2017 ; 104 Pages ; https://www.chainsawjournal.com/best-automatic-pool-cleaners/.

(Continued)

Primary Examiner — Sisay Yacob
(74) Attorney, Agent, or Firm — Oblon, McClelland, Maier & Neustadt, L.L.P.

(57) ABSTRACT

A swimming pool Smart Boat for pool maintenance and water safety is described. The Smart Boat includes chlorine and pH sensors for monitoring water quality and is capable of releasing chemicals into the pool water based on monitoring. A screen panel is configured to trap debris in the pool. Additionally, the Smart Boat provides for water safety by monitoring water disturbances which indicate a swimmer has entered the pool and sending an alert based on the detection of a disturbance. A remote control unit provides alerts and controls navigation, the release of chemicals and the screen panel position.

19 Claims, 20 Drawing Sheets

(51) Int. Cl.
*C02F 1/00* (2006.01)
*G05D 1/02* (2020.01)
*B63B 34/00* (2020.01)
B63B 35/73 (2006.01)
C02F 103/42 (2006.01)

(56) References Cited

U.S. PATENT DOCUMENTS

| | | | | |
|---|---|---|---|---|
| 4,813,366 | A * | 3/1989 | Elder | B63B 1/04 114/290 |
| 7,504,027 | B2 * | 3/2009 | Cosentino | A63H 23/04 210/167.2 |
| 7,930,987 | B2 * | 4/2011 | Mizutani | B63H 25/26 114/144 RE |
| 8,134,462 | B1 | 3/2012 | Tran et al. | |
| 2006/0060513 | A1 * | 3/2006 | Craig | E04H 4/1263 210/167.2 |
| 2007/0095731 | A1 | 5/2007 | Cosentino | |
| 2009/0084299 | A1 * | 4/2009 | Mizutani | B63H 21/265 114/144 RE |
| 2009/0152182 | A1 * | 6/2009 | Cosentino | A63H 23/04 210/167.2 |
| 2016/0160520 | A9 | 6/2016 | Porat | |
| 2017/0022728 | A1 | 1/2017 | Simik et al. | |
| 2017/0092096 | A1 | 3/2017 | Fernandes et al. | |

FOREIGN PATENT DOCUMENTS

| | | |
|---|---|---|
| EP | 1 540 612 B1 | 12/2009 |
| FR | 2 796 576 | 9/2011 |

OTHER PUBLICATIONS

BUHR ; This Oblong Device Will Tell Your Smartphone If Your Pool Is Ready for Swimming; techcrunch.com; Jun. 2, 2015; 2 pages; https://techcrunch.com/2015/06/01/this-oblong-device-will-tell-you-if-your-pool-is-ready-for-swimming/.

Sensorex; pH5000 Polycarbonate Swimming Pool pH Sensor; Sensorex Corp; Sep. 14, 2018; https://sensorex.com/product/ph5000-swimming-pool-ph-sensor/.

CIGS Whitepaper; Flexible, lightweight, thin film solar panels; CIGS Whitepaper; Sep. 17, 2018; 5 pages; http://cigs-pv.net/cigs-white-paper-initiative/.

Sensorex; ORP1000 Polycarbonate Laboratory ORP Sensor; Sensorex Corp; Sep. 14, 2018; sensorex.com/product/orp1000-light-duty-orp-sensor/; 4 pages.

* cited by examiner

SMART BOAT FOR SWIMMING POOL MAINTENANCE

BACKGROUND

Technical Field

The present disclosure is directed to a Smart Boat for swimming pool maintenance and water safety. In one aspect, the Smart Boat includes chlorine and pH sensors for monitoring water quality and is equipped to release chemicals into the pool water based on monitoring and evaluation of water quality. In another aspect, a screen panel is configured to remove particulate matter from pool water. Additionally, the Smart Boat provides for water safety by monitoring water disturbances which indicate a swimmer has entered the pool and sending an alert based on the detection of the disturbances. A remote control unit in operative communication with the Smart Boat provides alerts and controls navigation, the release of chemicals and the screen panel position. An optional fountain adds to the decorative appeal.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Swimming pools are a popular feature for residential homes. For example, there are over 10 million residential swimming pools in the United States.

Maintenance of swimming pools is a factor in ownership which can be confusing and time consuming. Although most swimming pools include a filtering system which filters small particles, large debris, such as leaves, are often removed by hand from the pool. The filtering system is not able to remove all contaminants. Chemicals, such as chlorine and algaecides must be added to kill fungus and balance the pH.

Another concern in swimming pool maintenance is water circulation. Conventional filtering systems are able to produce some water movement, but cannot filter and move all of the water in the pool. Therefore, chemicals added to the water by the filtering system cannot reach the entirety of the pool, allowing algae to grow. A known solution to the growth of algae is to use containers which hold chlorine blocks which float in the pool. Further, the owner must treat the pool periodically with algaecide.

Swimming pool chemical regulation is affected by human, climate and environment conditions. Humans contaminate the water with skin cells, feces, urine, oil and dirt. Rainwater adds unchlorinated water to the pool. The wind blows dirt and leaves into the water. High temperatures allow algae and bacteria to grow in the pool. A particular type of bacteria which grows in pools is Escherichia coli, or E. coli as it is popularly known. E. coli contamination is related to fecal matter in the water. A CDC study in 2013 found that 58% of pools tested positive for E. coli. E. coli bacteria is shown in FIG. 1. The balance of chemicals must be such that there is enough chlorine and algaecide to prevent the growth of algae and bacteria.

However, excessive chemical levels can cause sickness in humans and animals. For example, an excessive amount of chlorine in swimming pool water can cause symptoms of respiratory disease. In one study, 66.7% of children and 71.6% of adults developed respiratory problems due to chlorination in pools. Thus it is clear that swimming pool chemicals must be closely regulated to provide the proper balance.

In addition to maintaining the chemical balance in the pool, an owner must be alert that children and animals do not enter the water unattended. From 2004 to 2014, there were about 10 drowning deaths per day in the United States, and about 5000 people received emergency care for swimming pool accidents each year.

Some solutions to the above problems have been proposed in the past.

Fernandes in US20170092096, incorporated herein by reference in its entirety, describes a state of the art smart pool monitoring device as shown in FIG. 2. The device is connected to controlling and monitoring devices via the internet and has the ability to monitor the pool by use of an alert system included with the device. The device uses a buoy which floats in the swimming pool water. Sensing devices measure pH level, water temperature, and water salinity, level of pool water, ultraviolet (UV) and ORP indexes in water. The data is transmitted via radio signals to a gateway where it analyzes and stores the data. The data is accessible by smart devices like phones, laptops, PCs, etc. The device also works as an alert system where it can alert and notify the operator to the variance of the measured data compared to the standard safety data were set for pool safety. Further, an alert feature is provided that senses when a body or a person enters the pool water by measuring the water movement and its characteristics. However, this device does not have a propulsion system which enables it to test the pool water in less accessible areas of the pool, such as the center, not does it distribute chemicals into the pool based on the sensing.

As shown in FIG. 3, US20070095731, incorporated herein by reference in its entirety, describes a remote control pool skimmer in the form of a pontoon boat having a net which picks up surface debris. The skimmer 10 has the appearance of a model boat and is radio controlled. Two motors control propellers and are driven by a controller. The relative speed of each of the motors is varied to control direction. The pool skimmer has a skimmer net mounted between the pontoons. However, this skimmer cannot be automatically raised and lowered, nor is there any discussion of dispensing chemicals into the pool by the skimmer.

U.S. Pat. No. 8,134,462B1, incorporated herein by reference in its entirety, describes a floating sensor system which identifies swimmer entry event into a pool. The sensor is shown in FIG. 4. The entry event is analyzed at the sensor and sent by RF link to a local network of receiving stations. Any receiving station sends alarm information to a user at an end point station. An alarm signal may be sent and a computer display monitors and displays alarm messages. The swimming pool safety alarm can be sounded when a splash, followed by a particular swimming pattern, such as a random flailing pattern or the absence of a swimming pattern, is identified which indicates that a person is in distress. Further, this patent discloses a solar panel which enables the floating device to capture sunlight to recharge its electrical battery. A microcontroller monitors power level of the battery and controls the battery charging process.

None of the references described above disclose a remote controlled device which controllably traverses the surface of a pool, monitors chemical levels across the entire surface of the pool, distributes chemicals into the pool, monitors for unusual water turbulence indicating a swimmer in the pool, and provides the results of the monitoring to a display of the remote control.

SUMMARY

The present disclosure addresses the deficiencies of the prior art by providing a smart boat for swimming pool maintenance and water safety, a method for controlling a smart boat for swimming pool maintenance and water safety, and a system for swimming pool maintenance and water safety.

In an exemplary embodiment, a smart boat for swimming pool maintenance is disclosed which provides an innovative solution for adjusting the level of chlorine and acid. The smart boat contains pH and acid sensors. A first slider-crank mechanism is controllably configured to open a first gate to dispense chlorine from a first reservoir and a second slider-crank mechanism is controllably configured to open a second gate to dispense acid from a second reservoir. A controller has circuitry configured to receive and process signals from the pH and acid sensors and provide chemical alerts via a communications unit to a remote control unit, which is configured to receive the alerts. A display on the remote control lights up when a chemical alert is received from the smart boat.

A user interface on the remote control unit is configured to receive user input. The remote control is configured to generate control signals based on the user input and transmit the control signals to the controller to actuate motors connected to the slider crank mechanisms to open at least one gate to dispense chemicals.

In another embodiment, the smart boat further provides for water safety. The smart boat includes a motion sensor. The controller further has circuitry to receive and process signals from the motion sensor, the signals regarding turbulence in the water that may indicate that a body has entered the pool. The smart boat includes a whistling alarm and lighting which flashes when the level of turbulence is above a threshold. Via a communication unit, the controller transmits water turbulence alerts to a remote control unit, which is configured to receive the alerts. The remote control sounds a high level alarm when the level of turbulence is above a threshold. Additionally, a display on the remote control unit lights up when a water turbulence alert is received from the smart boat.

In a further embodiment, the smart boat includes a propeller, rudders and motors to propel and steer the boat. The remote control is configured to generate control signals based on user input and transmit the control signals to the controller to operate the motors to propel and steer the boat. Propelling and steering the smart boat solves the problem of chemical distribution, as the smart boat can be directed to areas of the pool which are not receiving proper chemical treatment.

In an embodiment, floating debris is captured by a screen panel on the front of the boat. The screen panel can be raised and lowered by a motor based on user generated control signals received from the remote control unit.

An additional embodiment provides for a cover on the top of the smart boat which includes solar cells which charge a battery within the smart boat.

A further embodiment is disclosed, in which a fountain is located on the front of the smart boat.

In a further exemplary embodiment, a method for controlling a smart boat for swimming pool maintenance and water safety includes a steering process, a chemical maintenance process, a water safety process, a debris collection process, a power generation process and generation of a fountain of water.

In another exemplary embodiment, a system for swimming pool maintenance and water safety includes a smart boat and a remote control unit for controlling operations of the smart boat, wherein the remote control unit actuates the propulsion system, steers the smart boat, releases chemicals and operates the debris collection system. A user interface of the remote control further comprises buttons for generating control signals to propel the boat forward, propel the boat backwards, steer the boat to the left or right, raise or lower a screen panel of the debris collection system and release chemicals.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
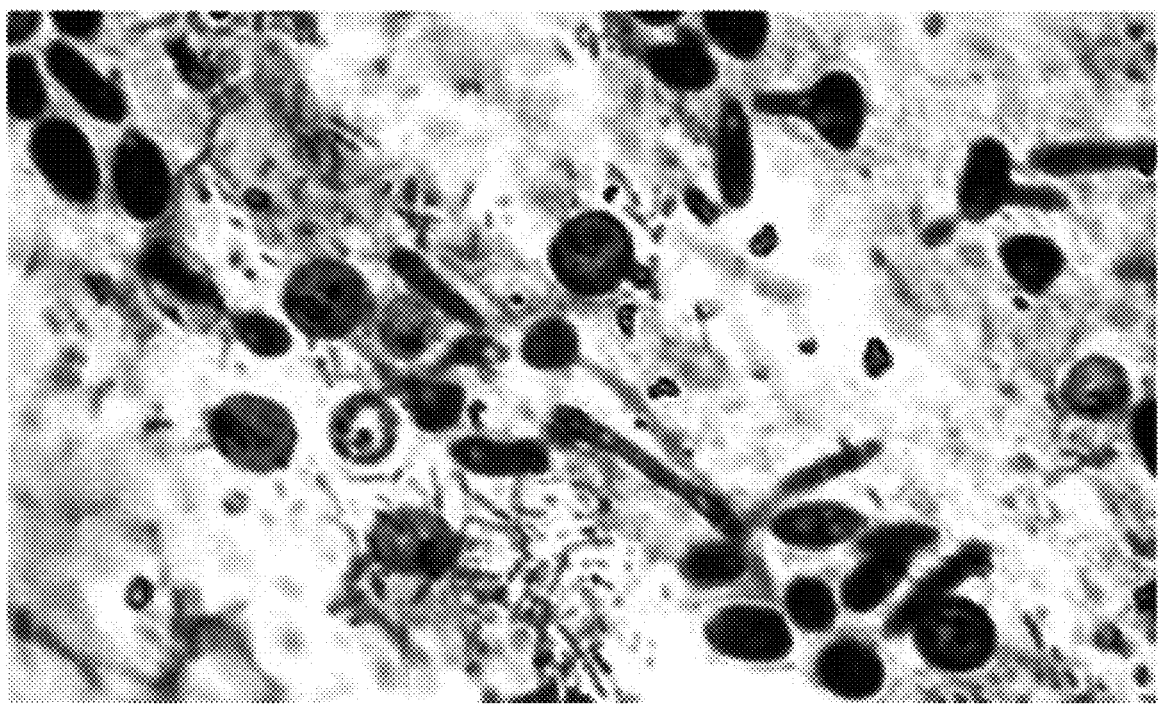
FIG. 1 is an illustration of Escherichia coli bacteria found in swimming pools.
Figure 2:
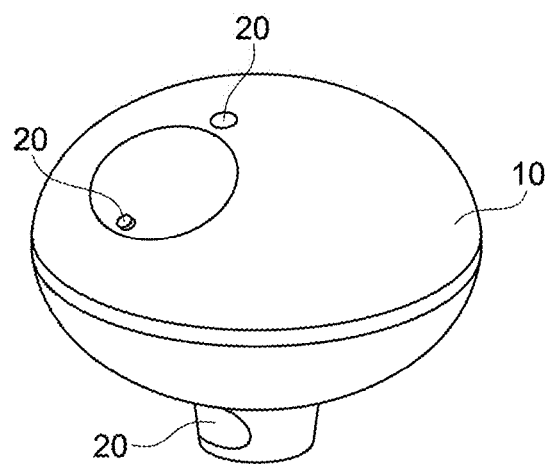
FIG. 2 shows a prior art smart pool monitoring device in the form of a smart buoy.
Figure 3:
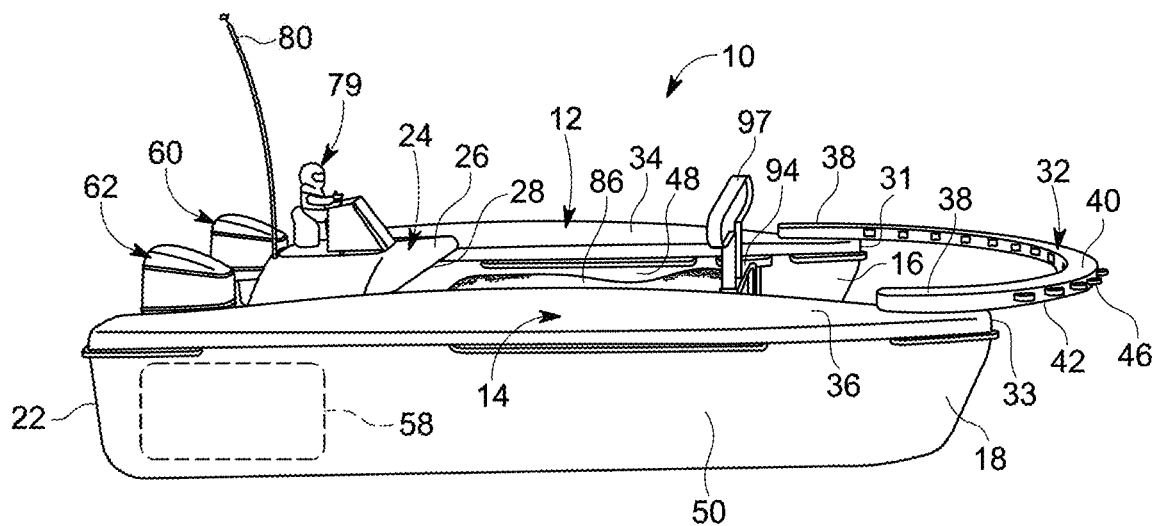
FIG. 3 depicts a prior art remote controlled pool skimmer in the form of a pontoon boat having a net which picks up surface debris.
Figure 4:
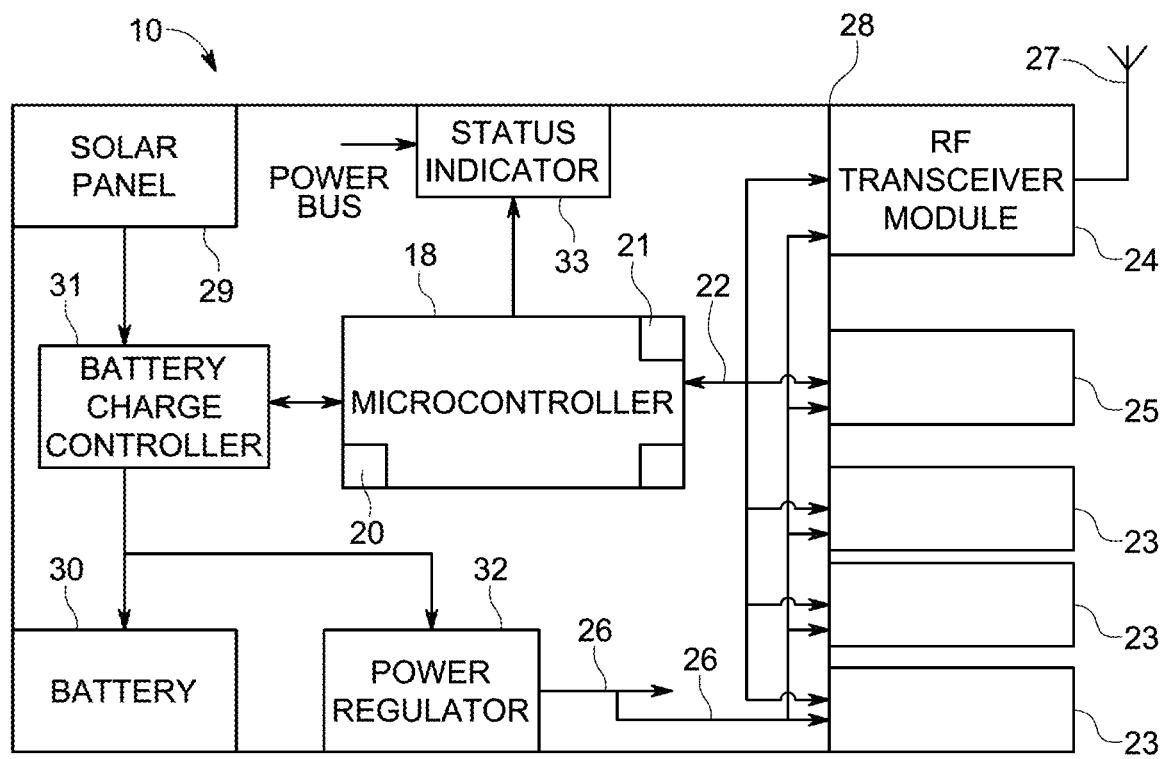
FIG. 4 is a sensor system which identifies swimmer entry into a swimming pool.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a smart boat for swimming pool maintenance and water safety, a method for controlling a smart boat for swimming pool maintenance and water safety, and a system for swimming pool maintenance and water safety.

Figure 5:
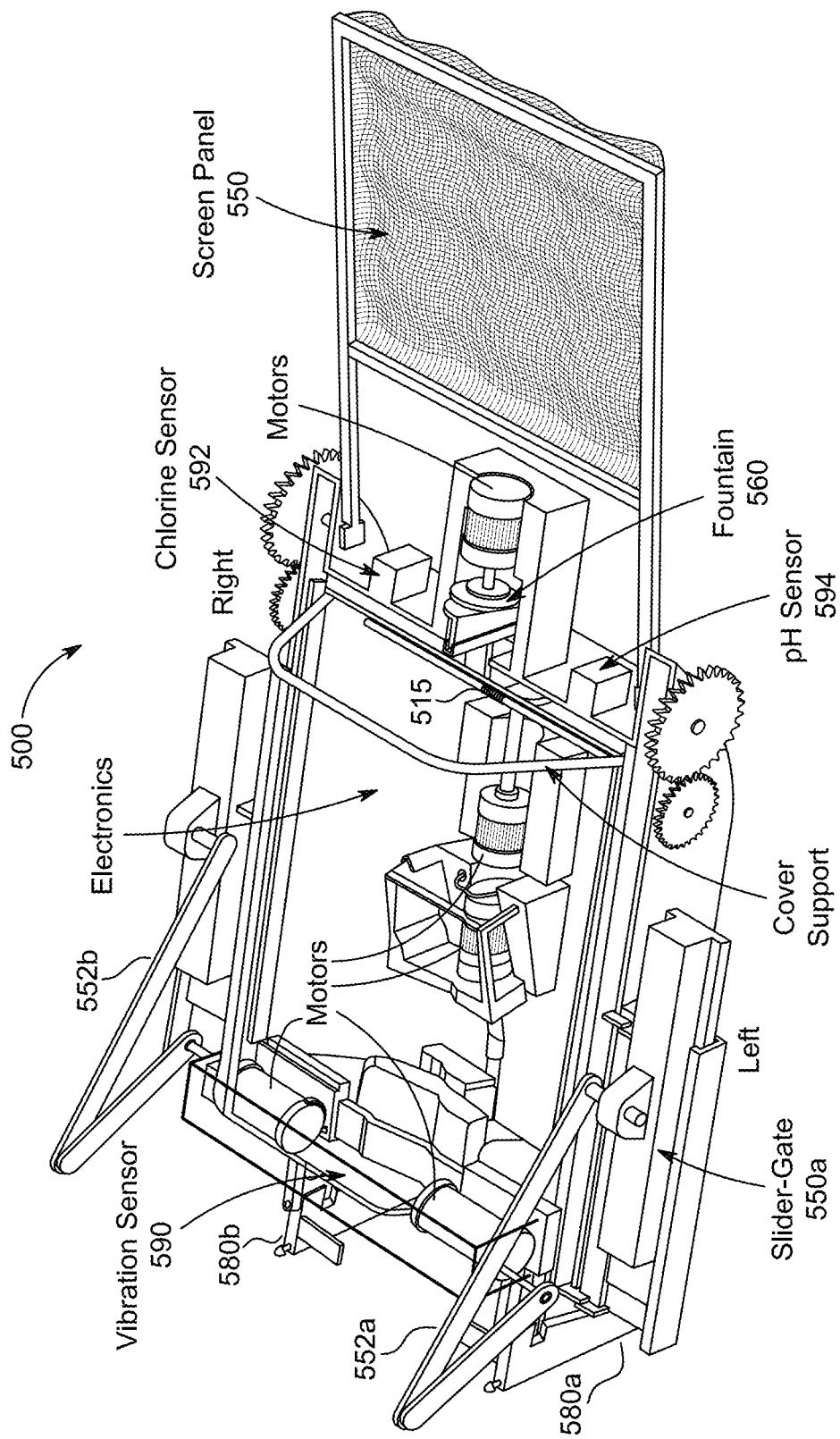
FIG. 5 is an overhead view of the smart boat, according to certain embodiments.
Figure 6:
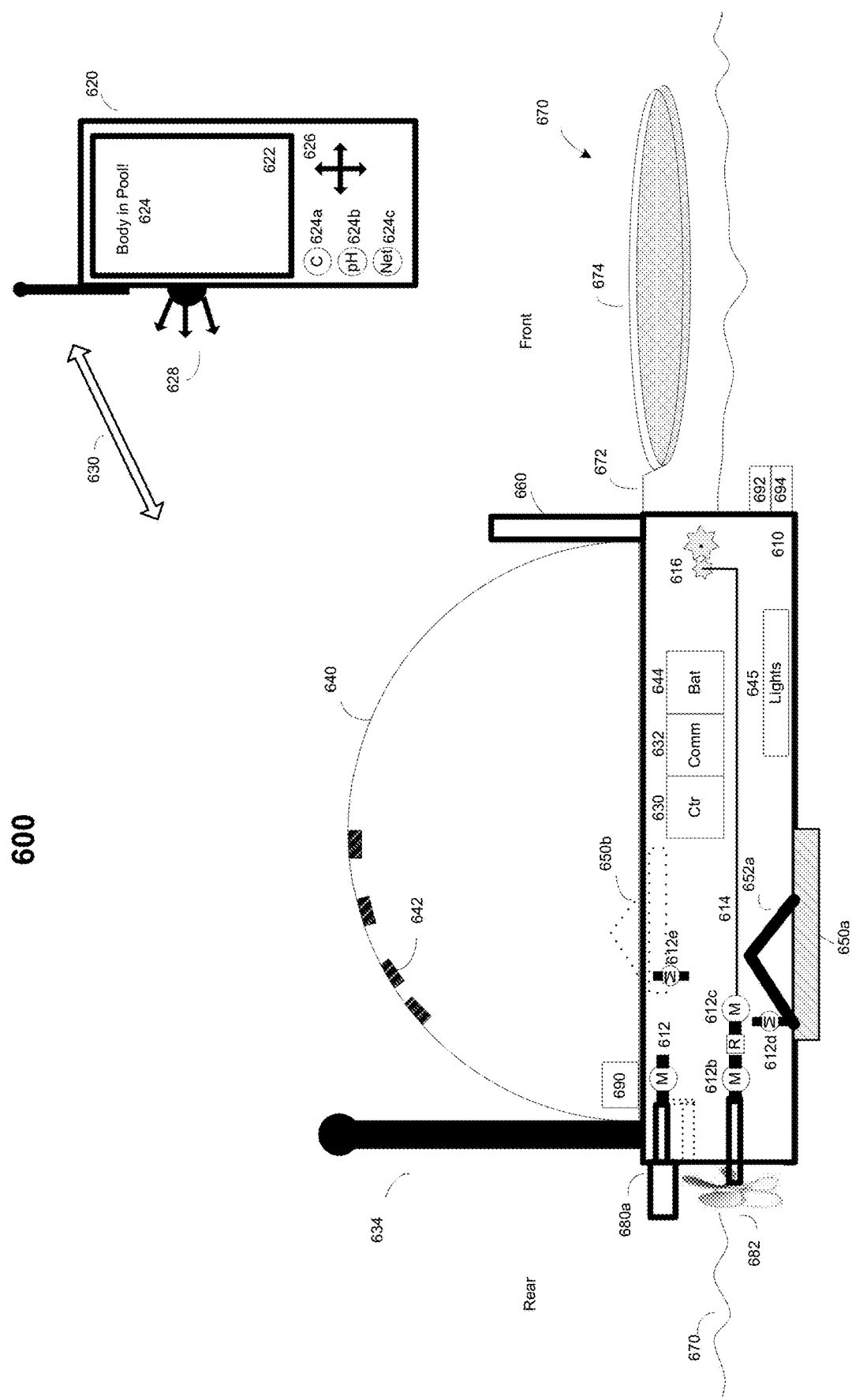
FIG. 6 is a cross-sectional view of the smart boat system and remote control unit, according to certain embodiments.

The exemplary embodiments of a smart boat for swimming pool maintenance and water safety are shown by an overhead view in FIG. 5 and in a cross-sectional diagram in FIG. 6. The smart boat may have three sensors for safety and filtering swimming pool water. As shown in FIG. 5, a vibration sensor is mounted on the top of the boat. Chlorine and pH sensors are located on the front of the boat. Slider cranks are mounted in the first and the second sides of the boat, which are configured to dispense chemicals. Additionally, a fountain is optionally located at the front for decorative appeal.

As shown in FIG. 6, swimming pool 670 contains a volume of water in which a smart boat 610 floats. Although shown in FIG. 6, the swimming pool water is shown only for illustrative purposes and is not necessarily part of the present invention.

Figure 10A:
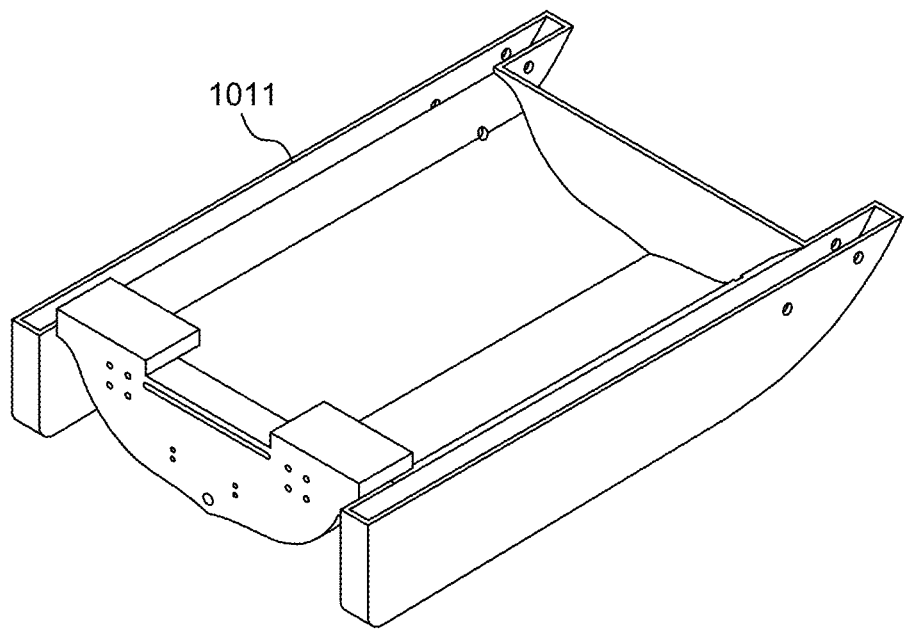
FIG. 10A depicts the smart boat hull.

Referring to FIG. 5, FIG. 6 and FIG. 10A, the smart boat 610 has a hull 1011 having bottom, front, rear, first and second sides as viewed from the front of the boat and a central axis extending from the front side to the rear side. A propeller 682 is located at the rear of the hull; a first rudder (580a, 680a) is located at the rear of the hull near the left side; and a second rudder 580b is located at the rear of the hull near the second side. Motor 612 operates the rudders to steer the boat in the left or the right direction. Motor 612b rotates the propeller in a clockwise direction and motor 612c rotates the propeller in a counterclockwise direction.

As shown in FIG. 5, there are two rudders 580a and 580b. FIG. 6, 18-21, each rudder comprises a rudder arm 1982, a rudder joint 2084, a rudder pin 1886 and a steering rod 2188, wherein rudder arm and the rudder joint are connected together, and the steering rod is connected at a first end to the rudder arm by the rudder pin and at a second end to motor 612a. Only one motor 612a is used to control the action of the rudders.

As shown with respect to FIG. 6-7, FIG. 14-17, the smart boat further has an apparatus designed to release chemicals into the swimming pool water. The apparatus is generally referred to as a slider-crank mechanism as is shown in FIG. 5.

A discussion of the slider crank mechanism now follows.

A slider-crank linkage is a four-link mechanism with three revolute joints and one prismatic, or sliding, joint. The rotation of the crank drives the linear movement the slider. There are two types of slider-cranks: in-line and offset. The in-line slider crank mechanism is used in present disclosure.

An in-line slider-crank has its slider positioned so the line of travel of the hinged joint of the slider passes through the base joint of the crank. This creates a symmetric slider movement back and forth as the crank rotates.

An in-line crank slider is oriented in a way in which the pivot point of the crank is coincident with the axis of the linear movement. The follower arm, which is the link that connects the crank arm to the slider, connects to a pin in the center of sliding object. This pin is considered to be on the linear movement axis. Therefore, to be considered an in-line crank slider, the pivot point of the crank arm must be in-line with this pin point. The stroke ($(\Delta R4)$max) of an in-line crank slider is defined as the maximum linear distance the slider may travel between the two extreme points of its motion. With an in-line crank slider, the motion of the crank and follower links is symmetric about the sliding axis. This means that the crank angle required to execute a forward stroke is equivalent to the angle required to perform a reverse stroke. For this reason, the in-line slider-crank mechanism produces balanced motion. This balanced motion implies other ideas as well. Assuming the crank arm is driven at a constant velocity, the time it takes to perform a forward stroke is equal to the time it takes to perform a reverse stroke.

The in-line slider crank achieves the desired stroke, the appropriate lengths of the two links and the crank and follower. These values may be obtained from data models. For this case, the crank arm will be referred to as L2, and the follower link will be referred to as L3. With all in-line slider-crank mechanisms, the stroke is twice the length of the crank arm. Therefore, given the stroke, the length of the crank arm can be determined. This relationship is represented as:

$$L2 = (\Delta R4)\text{max} \div 2$$

Once L2 is found, the follower length (L3) can be determined. However, because the stroke of the mechanism only depends on the crank arm length, the follower length is somewhat less significant. As a general rule, the length of the follower link should be at least 3 times the length of the crank arm. This is to account for an often undesired increased acceleration yield, or output, of the connecting arm.

The mechanism includes a first sliding gate (750a, 1450), located on a first side of the hull, the first sliding gate including at least one reservoir 1451 of chlorine. The sliding gate slides within a slider base (756a, 1566), which serves as a track to guide the sliding and also as a cover to hold the chlorine in the reservoir. As the sliding gate moves toward the front of the smart boat, a reservoir is uncovered, releasing the chlorine.

Figure 14:
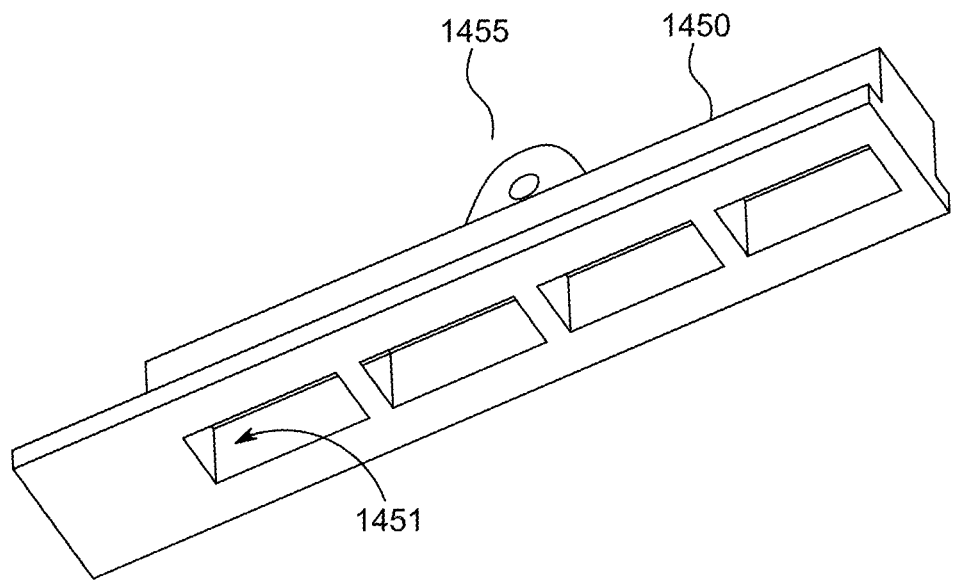
FIG. 14 depicts the slider gate.
Figure 15:
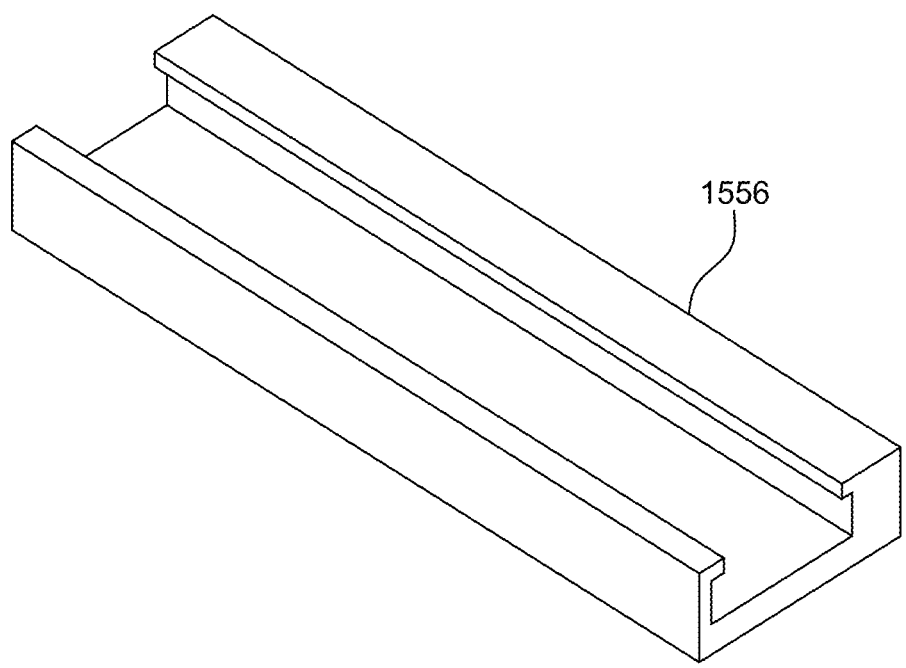
FIG. 15 depicts the slider base.
Figure 16:
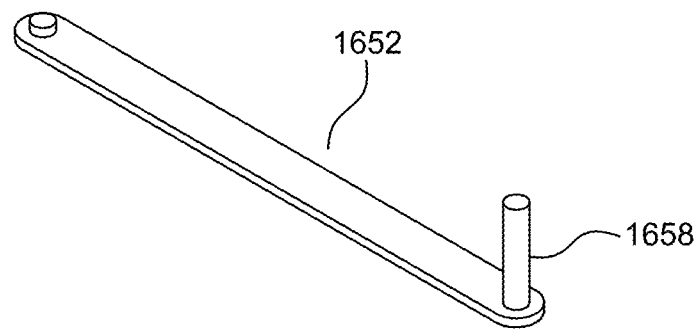
FIG. 16 depicts the slider rod.
Figure 17:
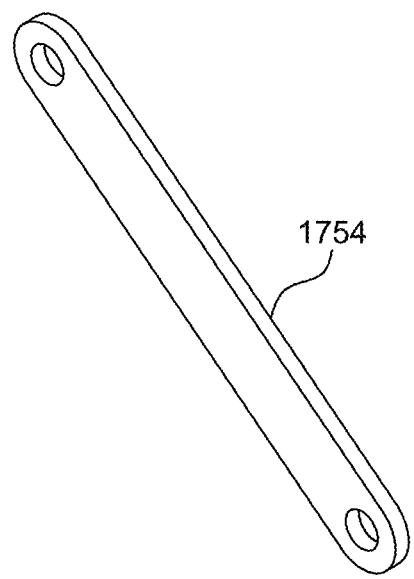
FIG. 17 depicts the slider crank rod.
Figure 18:
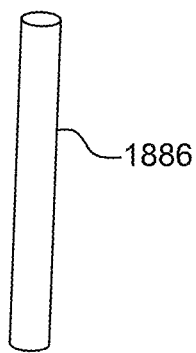
FIG. 18 depicts the rudder pin.
Figure 19:
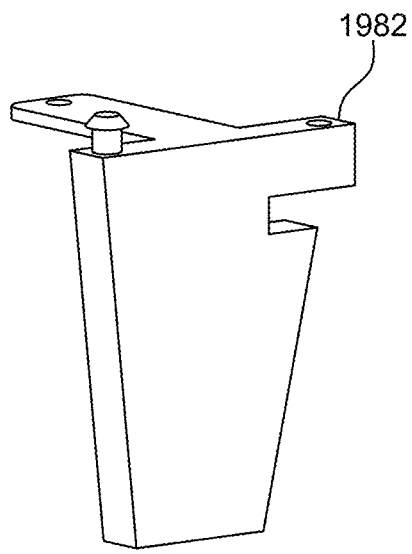
FIG. 19 depicts the rudder arm.
Figure 20:
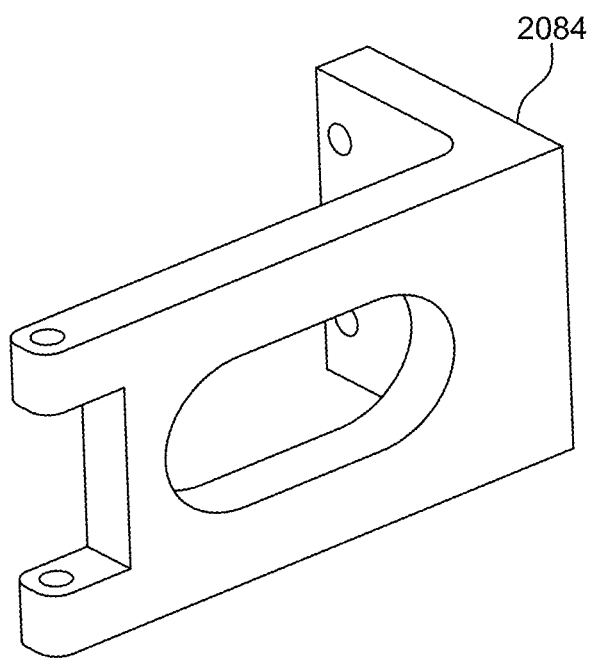
FIG. 20 depicts the rudder joint.
Figure 21:
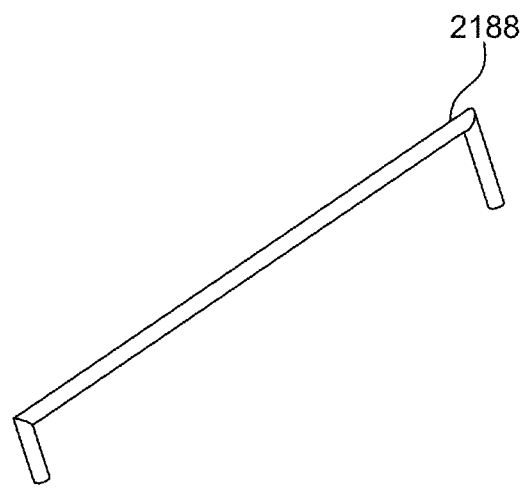
FIG. 21 depicts the steering rod.
Figure 22:
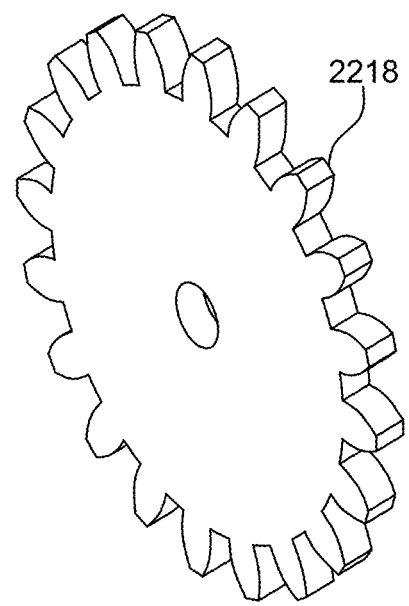
FIG. 22 depicts the lifting pinion of the helical gears.
Figure 23:
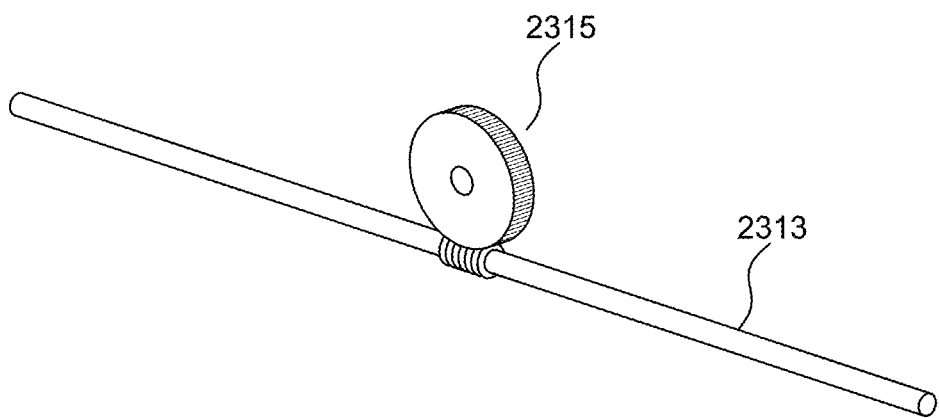
FIG. 23 depicts the worm gear.

The smart boat further includes a second sliding gate (750b), located on a second side of the hull, the second sliding gate including at least one reservoir of acid, identical to reservoir 1451 of FIG. 14. The sliding gate slides within slider base (756b, 1566). As the sliding gate moves toward the front of the smart boat, the reservoir 1451 is uncovered, releasing the acid.

The slider gates (750a, 750b) are filled with chlorine or acid respectively by a person responsible for the chemical maintenance of the swimming pool. The slider gates may be a filled from bottles of chlorine or acid solutions, or may be cartridge packs which are loaded into the slider bases. Further, the chlorine or acid in the reservoir may be in solid, liquid or powder form. If a cartridge pack is used, the cartridge pack may be covered by a water soluble cover which dissolves when the reservoir is uncovered.

Figure 7:
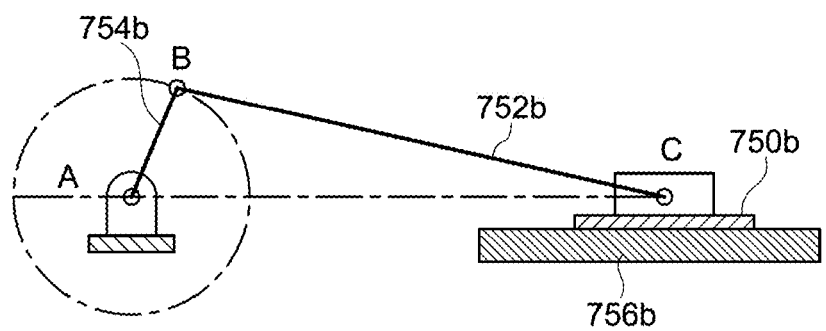
FIG. 7 is an illustration of the slider-crank mechanism, according to certain embodiments.
Figure 7:
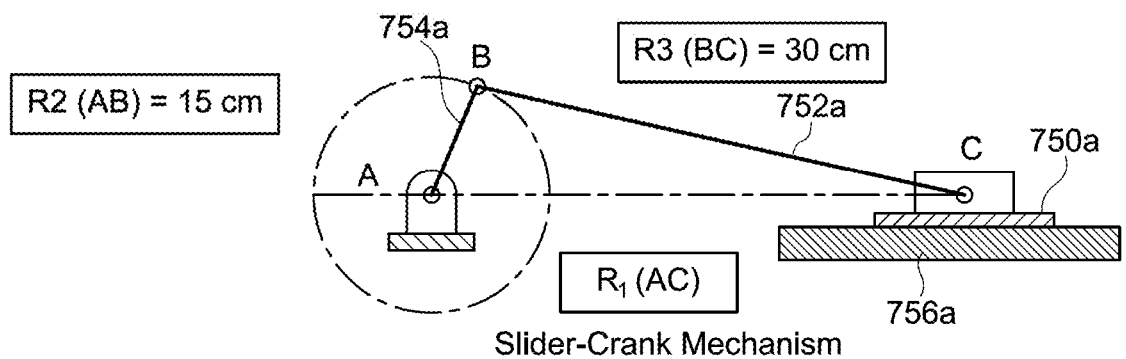

In order to move the slider gates (750a, 750b) forward within the slider bases (756a, 756b), a first slider-crank mechanism (752a, 754a), as shown in FIG. 5 and FIG. 7, is located on the first side of the hull and operatively connected to the first sliding gate 750a; a second slider-crank mechanism (752b, 754b) is located on the second side of the hull and is operatively connected to the second sliding gate 750b. The slider crank mechanism consists of a slider crank rod (754a, 754b, 1754) and a slider rod (752a, 752b, 1652). A first end of the slider crank rod 1752 has a through hole which is connected to a shaft of a motor (612d, 612e). The shaft and hole may be connected by a locking cap, cotter pin, or other securement known in the art. The second end of the slider crank rod 1754 is connected to the first end of the slider rod 1652 by a pivot joint, as is shown by a slightly raised pin of the slider rod 1652 in FIG. 16. The slider rod includes a perpendicularly oriented pin 1658 which fits into a through hole 1455 (see FIG. 14) of the sliding gate. As rotation of the motor shaft rotates the slider crank rod in a clockwise direction (as shown in FIG. 7), the sliding gate (750a, 750b) moves forward. When the sliding gate moves past the end of the slider base (756a, 756b), a reservoir 1451 is uncovered, which allows release of a chemical. The sliding gate may be moved forward to uncover a second, third and fourth gate. A region of the swimming pool water may show a high need for more chemical, in which case more than one gate can be uncovered. Alternatively, the smart boat can be moved to another region of the pool to release a second reservoir of chemical. As described below, the smart boat is navigated (by a user) to areas of the pool, where chemical levels are measured, and treats the subject area if needed.

Figure 8:
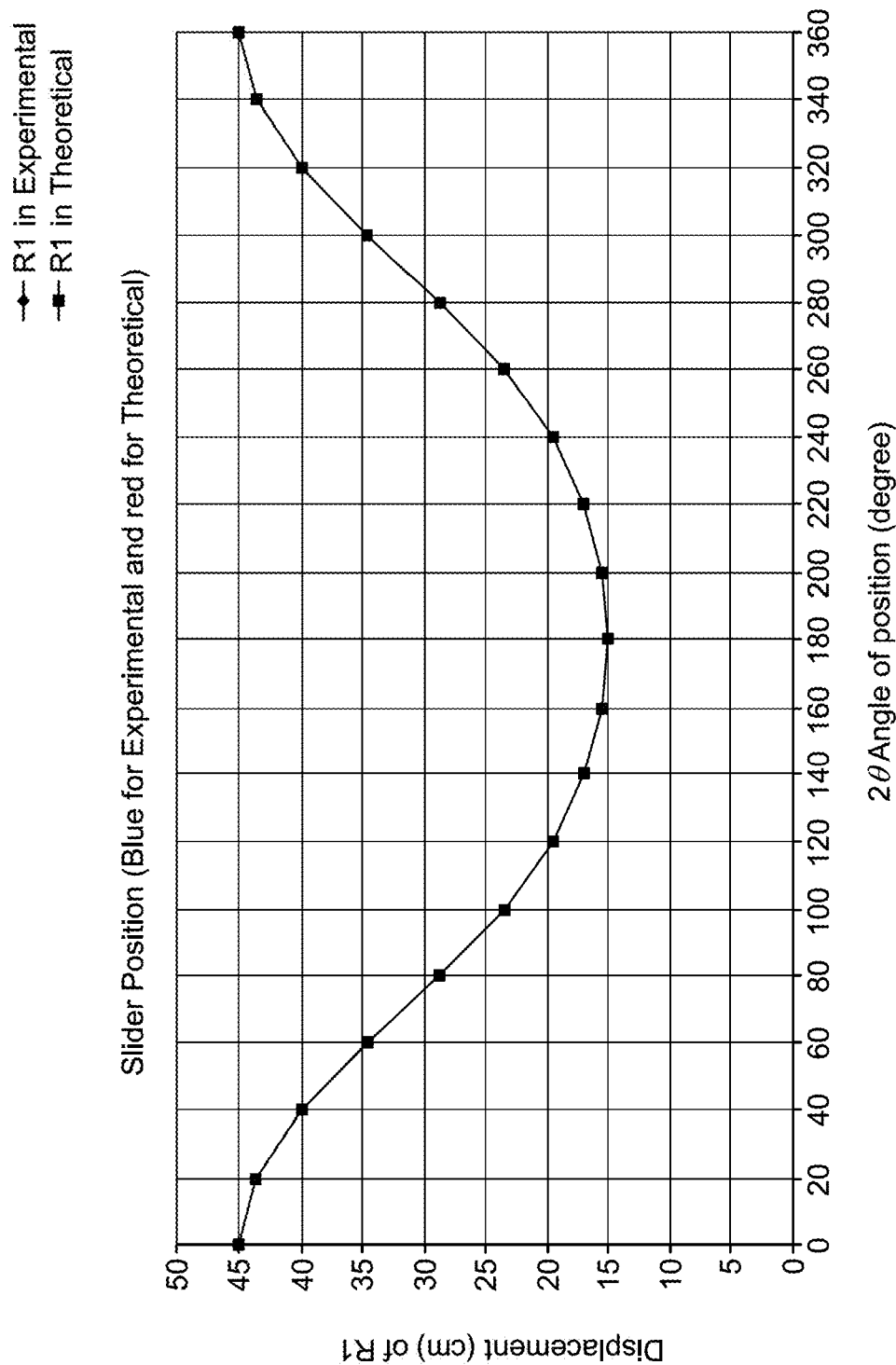
FIG. 8 is a graph of the slider-crank motor angle versus the displacement of the slider gate.

FIG. 8 shows the slider-crank displacement analysis. The plot represents the slider gate displacement with respect to the slider crank angular rotation.

In an embodiment which enables debris collection, a screen panel 670 is located at the front side of the hull, wherein the screen panel is connected to gears 616 which raise or lower the screen panel.

Figure 12:
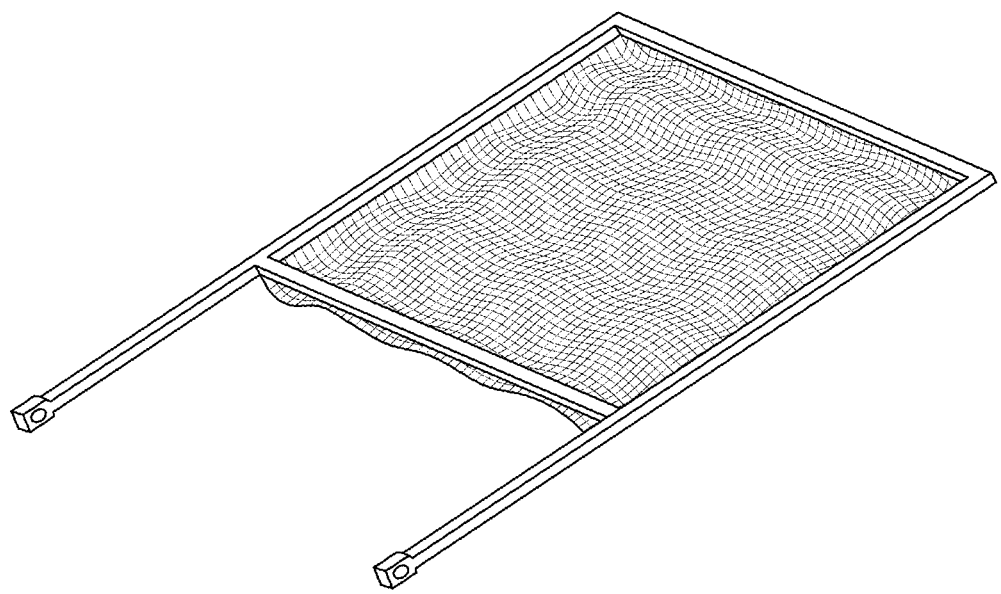
FIG. 12 depicts the screen panel.
Figure 13:
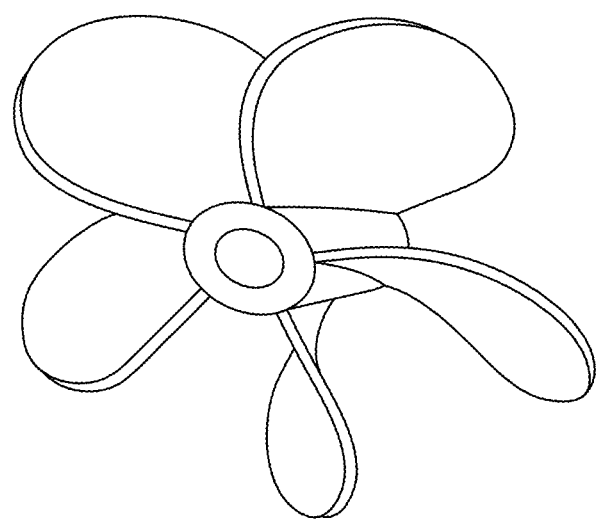
FIG. 13 depicts the propeller.

Referring now to FIG. 6, FIG. 9, FIG. 11, FIG. 12, FIG. 22 and FIG. 23, the screen panel 670 comprises a boat net 674 having two legs (as seen in FIG. 12), a first net shaft 1176a and a second net shaft 1176b. Each net shaft has a smooth end 1178, which fits into an accompanying leg of the screen panel. The second end 1177 is slotted to receive a connecting pin which mates the second end to a lifting pinion gear (917) of a set of helical gears 616. The connecting pin and slot may be secured by a locking cap, cotter pin, or other securement known in the art.

There are two sets of helical gears which operate to lift the screen panel, one set on the second side of the smart boat and one on the first side of the smart boat, as shown in FIG. 5. These two sets each comprise a first and second turning pinion gear (918, 2218), a first and second lifting pinion gear 917. A worm gear worm gear turning shaft 2313 has a first end, a second end and a center. The first and second turning pinion gears are connected to the worm gear turning shaft 2313 at the first and second ends respectively. The worm gear is placed at the center of the worm gear turning shaft and is operatively connected to turn the worm gear turning shaft when the worm gear turns.

Figure 26:
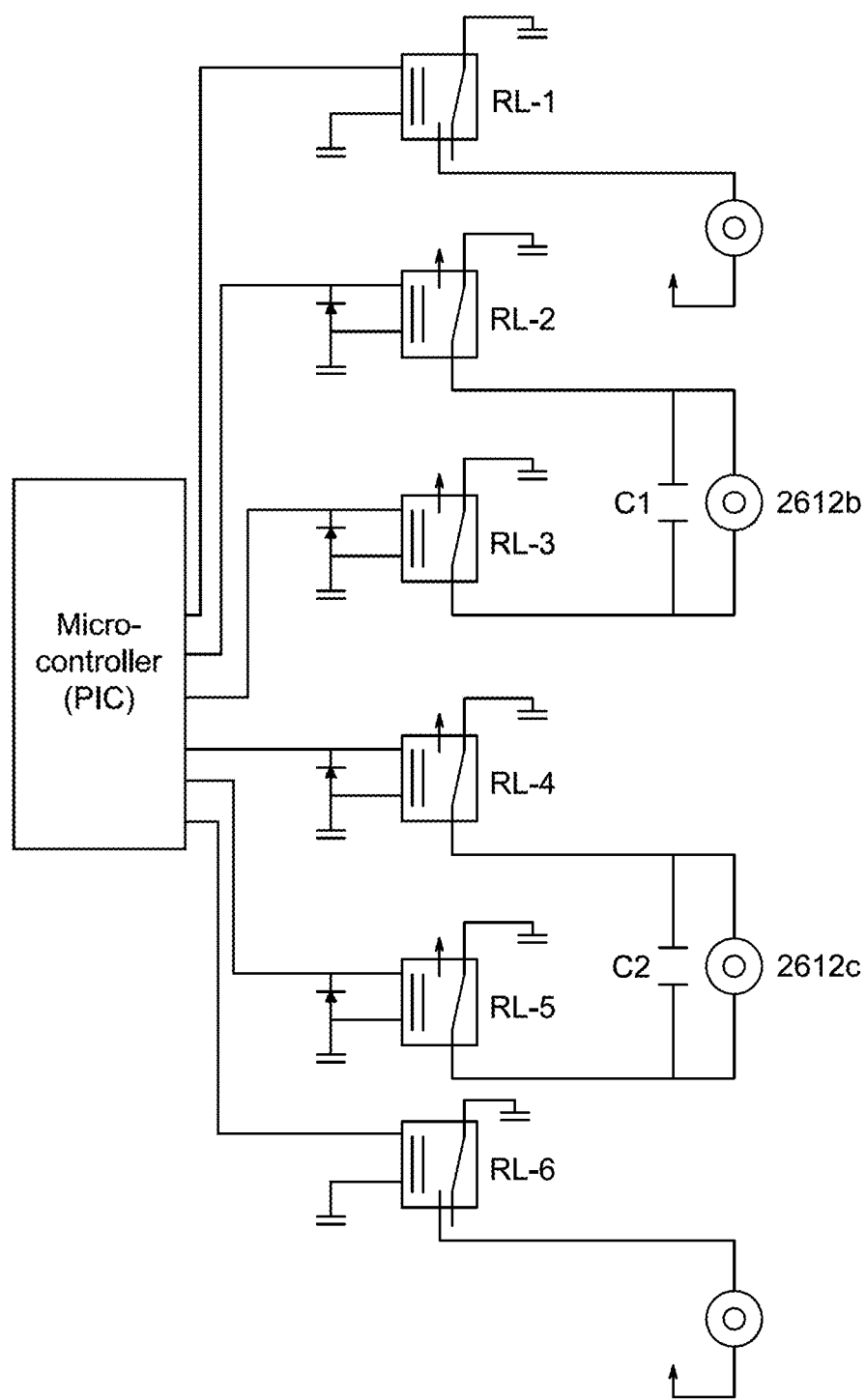
FIG. 26 depicts an exemplary wiring diagram for some of the motors.

The worm gear is operatively connected to the shafts of motors (612b, 2612b) and (612c, 2612c) by relays RL-2 and RL-4 connected to the motors respectively, as shown by FIG. 6 and FIG. 26.

The first turning pinion gear and the first lifting pinion gear intermesh to operatively raise the screen panel when the motor, either 612b or 612c, turns the worm gear in a first direction; and the second turning pinion gear and the second lifting pinion gear intermesh to operatively lower the screen panel when the motor, either 612b or 612c, turns the worm gear in a second direction opposite the first direction. Although this embodiment describes raising and lowering the screen panel using the motors 612b and 612c, other means for raising and lowering the screen panel can be used, as is known in the art. For example, there could be two turning shafts connected each to a separate motor. Alternatively, there could be a lifting bar on either side or one side of the boat, where the bar lifts the screen panel by toggling the bar under action of a motor connected to the bar. In this situation, the turning shaft, worm gear and helical gears would be replaced by the lifting bar.

The smart boat further includes sensors for chemical maintenance of the swimming pool water. As shown in FIG. 5, a chlorine sensor 592 is located at the front second side of the hull and a pH sensor 594 is located at the front first side of the hull. In non-limiting examples, the chlorine sensor may be of the type ORP100 Polycarbonate laboratory ORP sensor available from Sensorex, 11751 Markon Drive, Garden Grove, Calif. 92841 USA at https://sensorex.com/product/orp1000-light-duty-orp-sensor/. The pH sensor may be of the type available from Sensorex, 11751 Markon Drive, Garden Grove, Calif. 92841 USA https://sensorex-.com/product/ph5000-swimming-pool-ph-sensor/.

The smart boat further includes a turbulence sensor 590 as shown in FIG. 5. The turbulence sensor is located at the rear of the smart boat and is raised above the hull surface. In a non-limiting example, the turbulence sensor may be of the type described in U.S. Pat. No. 8,134,462B1, incorporated herein by reference in its entirety, which describes a floating sensor system which identifies swimmer entry event into a pool.

The smart boat further includes at least one lighting unit 645, which may be located on at least one of the front, rear and sides of the hull; a communications unit 632, a rechargeable battery 644 and a controller 630 located in the hull. The controller is operatively connected to the motors, the battery, the lighting unit and the communications unit. The controller is further operatively connected to receive measurement signals from the vibration sensor, the chlorine sensor and the pH sensor.

In an embodiment shown in FIG. 5, the smart boat includes a decorative fountain 560, which is located at the front of the hull. The decorative fountain is connected to a tapered plenum attached to a water scoop located beneath the hull.

Figure 24:
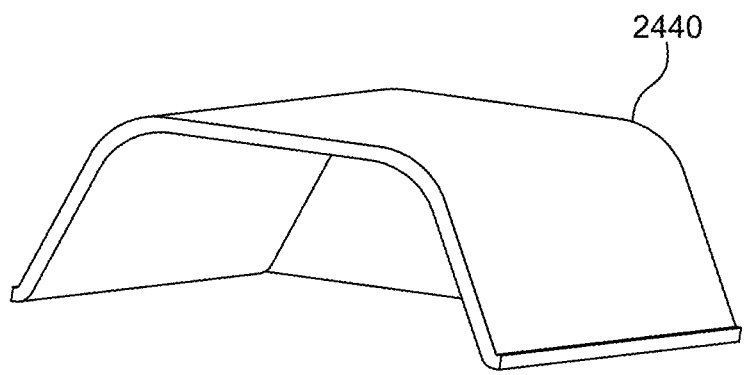
FIG. 24 depicts the smart boat cover.
Figure 25:
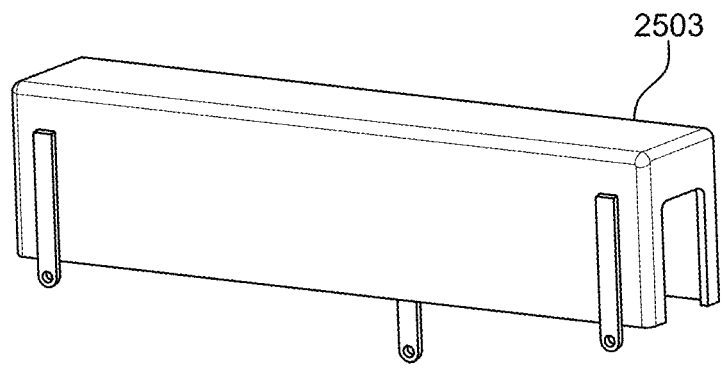
FIG. 25 depicts the cover for the motor and electronics.

In a further embodiment shown in FIG. 6, FIG. 24 and FIG. 25, the smart boat includes an electronics cover 2503 and a top cover (640, 2440). The electronics cover is disposed over the motors, communication unit, battery and controller. The electronics cover is hermetically sealed to the smart boat hull to protect the communication unit, battery and controller. The top cover is connected to a cover support on the first and second sides of the hull, and is located above the electronics cover. The top cover is transparent and comprises a plurality of solar cells 642 on an underside of the cover.

The solar cells are configured to generate electricity from rays of the sun impinging on the cover. The top cover is electrically connected to the battery, which is configured to be recharged by electricity generated by the solar cells.

The solar cells are of the thin film type. The solar cells are laminated or glued to the underside of the top cover. These solar cells are flexible and light weight. In a non-limiting example, the solar cells used in the present disclosure may be of the copper indium gallium diselenide type available from Global Solar Energy, Tucson, Ariz., USA http://www-.globalsolar.com/technology.

The battery is rechargeable, and is configured to be at least partially recharged by the solar cells. A docking station is used to fully charge the smart boat. The docking station is configured as known in the art.

In a further embodiment as shown with respect to FIG. 6, the smart boat or smart boat system further comprises a remote control unit 620, wherein the remote control unit is operatively connected to receive communications from the communication unit and to transmit control signals to the communication unit. The remote control unit includes a display 622, wherein the display is configured to display first alerts regarding swimming pool chemical status and second alerts regarding the motions of a body in the swimming pool and/or related water disturbance. An example alert 624 for indicating a person or body has entered the pool is shown as a written message on the front of display 622. However, the alert could be a color change of the display, such as a green screen shown when there is no alert status, and a flashing red screen when there is an alert.

The remote control further includes a user interface, wherein the user interface is configured to receive user input regarding the first and second alerts, and to transmit first and second control signals to the communication unit based on the user input. For example, the display may alert the user that chlorine is low in the swimming pool and the user may press button 624a to send a control signal to the smart boat to operate the slider-crank mechanism to open one of the reservoirs of chlorine.

The remote control unit includes buttons 624a, to release chlorine, 624 to release acid, and 624c to raise or lower the screen panel net. A propulsion and steering controller 626 enables the remote controller to transmit signals for controlling the rudder positions of the smart boat. As is known in the art, the up and down arrows of 626 control forward and backward movement of the smart boat, and the left and right arrows control left and right steering positions of the rudder. Communication between the remote controller and the communication unit of the smart boat is bidirectional and is on a communication channel 630.

Controller 630 is configured to operate the motors to actuate the propeller to propel the boat, move the rudders to steer the boat, turn the worm gear to lift the screen panel and actuate the first and second slider-crank mechanisms based upon control signals received from the remote control unit.

The vibration sensor, the chlorine sensor and the pH sensor are configured to transmit measurement signals to the controller. The controller has circuitry configured to receive the measurement signals, process the measurement signals to determine an alert status, and control the communications unit to transmit the alert status to the remote control.

The controller further comprises a sound generator, wherein the sound generator produces an alarm, such as a bell and/or a whistling noise, when an alert status is determined. The controller further actuates the lighting unit 645 to flash lights when the alert status is determined.

In a further exemplary embodiment, a method for controlling a smart boat for swimming pool maintenance and water safety includes a steering process, a chemical maintenance process, a water safety process, a debris collection process, a power generation process and an optional water fountain generation process.

As shown in FIG. 6, the steering process includes receiving, at a communication unit 632 operatively coupled to a controller 630, a forward navigation control signal from a remote control unit 620; actuating, by the controller, a motor 612b coupled to a propeller, wherein the actuation of the motor 612b rotates the propeller in a clockwise direction causing the smart boat to move forward; receiving, at the communication unit, a reverse navigation control signal from the remote control unit; actuating, by the controller, a motor 612c coupled to the propeller, wherein the actuation of the motor 612c rotates the propeller in a counterclockwise direction causing the smart boat to move backwards. The method continues by further receiving, at the communication unit, a rudder control signal from the remote control unit (as indicated by "joystick" 626) and actuating, by the controller, a motor 612a, causing at least one rudder to move to the first side or the second side, wherein movement of the rudder causes the smart boat to move to the left or the right.

The chemical maintenance process is depicted in FIG. 5 and FIG. 6, includes measuring, by a chlorine sensor 592, the quantity of chlorine in the swimming pool water; receiving, by the controller 630 which is operatively connected to the chlorine sensor, the measurement of the quantity of chlorine; processing, by the controller, the measurement of the quantity of chlorine to determine whether the quantity of chlorine is below a chlorine threshold level. The method further includes transmitting, by the communication unit 632, a chlorine alert signal to the remote control unit when the quantity of chlorine is below the chlorine threshold level. As mentioned above, the controller 630, communication unit 632 and remote control unit 620 communicate over communication channel 630.

The remote control unit displays the chlorine alert on display 624 as an alert message 624, a screen color change or a flashing screen. The remote control unit may also sound an alarm from alarm unit 628 to notify a user that the chlorine level is below threshold.

The method includes receiving, at a user interface (624a, 624b, 624c) of the remote control unit, a user input related to the alert which generates a chlorine control signal, and transmitting the chlorine control signal to the communications unit of the controller; receiving, by the controller, the chlorine control signal; actuating, by the controller, a motor 612d operatively connected to a first slider-crank mechanism, the first slider-crank mechanism further operatively connected to a first sliding gate having a plurality of chlorine reservoirs, wherein actuating the motor 612d causes the first slider-crank mechanism to move the first sliding gate to release a quantity of chlorine into the water.

The method continues by measuring, by an acid sensor 594, the quantity of acid in the swimming pool water; receiving, by the controller which is operatively connected to the acid sensor, the measurement of the quantity of acid; processing, by the controller, the measurement of the quantity and/or the concentration of acid to determine whether the quantity of acid is below an acid threshold level; transmitting, by the communication unit, an acid alert signal to the remote control unit when the quantity of acid is below the acid threshold level; displaying, on a display of the remote control unit, the acid alert. The method for controlling the acid in the pool continues by receiving, at a user interface of the remote control unit, a user input related to the acid alert and generating an acid control signal; transmitting the acid control signal to the communications unit of the controller; receiving, by the controller, the acid control signal. The method continues by the controller actuating a motor 612e operatively connected to a second slider-crank mechanism, the second slider-crank mechanism further operatively connected to a second sliding gate having a plurality of acid reservoirs, wherein actuating the motor 612e causes the second slider-crank mechanism to move the second sliding gate to release a quantity of acid into the water.

The method further comprises a water safety process, including measuring, by a turbulence sensor 590 within the smart boat, vibrations caused by turbulence of the water in the swimming pool, wherein high turbulence indicates that a body has entered the swimming pool; receiving, by the controller which is operatively connected to the turbulence sensor, measurements of the vibrations; processing, by the controller, the measurements of the vibrations to determine whether the vibrations are above a turbulence threshold level; and sounding, by a sound generator operatively connected to the controller, a noise to alert at least one listener that a body has entered the swimming pool; actuating, by the controller, a lighting unit 645 on the smart boat, wherein actuating the lighting unit causes the lighting unit to flash lights; transmitting, by the communication unit 632, a turbulence alert to the remote control unit when the vibrations are above the turbulence threshold level; displaying the turbulence alert on the remote control display 622; sounding an alarm, by a sound generator 628 within the remote control unit, to notify at least one user that a body has entered the swimming pool.

The method for controlling the smart boat further comprises a debris collection process, including receiving, at the user interface of the remote control unit, a user input (button 624c) regarding operation of a screen panel of the smart boat; transmitting, by the remote control unit, a screen panel control signal to the communications unit of the smart boat; receiving, by the communication unit, the screen panel control signal; actuating at least one of a first relay RL-2 connected to the motor 612b to raise the screen and a second relay RL-4 connected to the second 612c to lower the screen panel, based on the screen panel control signal. The circuit for raising and lowering the screen panel is shown in FIG. 26.

The method continues with a power generation process, including connecting a top cover (640, 2440) to the smart boat as shown in FIG. 6 and FIG. 24, wherein the top cover is transparent and comprises a plurality of solar cells 642 on an underside of the top cover, and generating, with the solar cells, electricity from rays of the sun impinging on the cover. Further, the method continues by electrically connecting the top cover to the battery; and recharging the battery by the electricity generated by the solar cells.

The method for controlling the smart boat continues by connecting a decorative fountain to the front of the smart boat, the decorative fountain having a tapered plenum attached to a water scoop located beneath the smart boat, operating the first motor to cause the boat to move forward, thus scooping water by the water scoop as a result of the forward motion. Compressing the water through the tapered plenum results in the generation of a fountain of water.

In a further exemplary embodiment, a system for swimming pool maintenance and water safety is described with respect to FIG. 5 and FIG. 6. The system includes a smart boat 500, wherein the smart boat includes a propulsion system, a steering system, at least one chemical sensing system, a water turbulence measuring system, a chemical replenishing system, a debris collection system, a controller 630 having processing circuitry and a communication unit 632; a remote control unit 620 for transmitting control signals to the communication unit to actuate the propulsion system, steer the smart boat, replenish chemicals and operate the debris collection system.

The controller receives chemical measurement signals from the at least one chemical sensor (592, 594) regarding a level and/or concentration of one or more chemicals in the swimming pool water, processes the signals, compares the chemical measurement signals to one or more threshold levels, and transmits, by the communication unit, an alert to the remote control unit when the level of a chemical is below a corresponding chemical threshold level; wherein the remote control unit receives the alert, displays the alert upon a display operatively connected to the remote control unit and sounds an alarm to notify a user of the alert.

Preferably there are at least two sensors in the boat, one for measuring pH and another for measuring chlorine. When the pH or chlorine levels fall below their respective thresholds, a red light may be displayed on the remote control display indicating that the user should press a button in the remote control to open the slider. The display screen will display ("Low chlorine" or "Low pH"). Otherwise the display will show a green light for normal chlorine and pH levels.

The remote control unit further comprises a user interface to receive a user input regarding the alert (see buttons 624a, 624b, 624c), generates a control signal based on the user input and transmits the control signal to the communication unit over communication channel 630. The controller receives the control signal from the communication unit and transmits at least one actuation signal to a chemical replenishment device to replenish the chemical.

The controller further receives water turbulence measurement signals from the water turbulence sensor 590 regarding the turbulence in the swimming pool water, processes the water turbulence measurement signals, compares the water turbulence measurement signals to a threshold level, and transmits, by the communication unit, a safety alert to the remote control unit when the water turbulence measurement is above a water turbulence threshold level. When the remote control unit receives the safety alert, it displays the safety alert 624 upon a display operatively connected to the remote control unit and/or sounds an alarm using sound generator 628 to notify a user of the safety alert.

The user interface of the remote control further comprises buttons (624a, 624b, 624c) and a "joystick" 626 for generating control signals to propel the boat forward, propel the boat backwards, steer the boat to the left or right, raise or lower a screen panel of the debris collection system and release chemicals.

The turbulence sensor operates by sensing the bandwidth of signals generated by waves due to a person or body entering or splashing in the water. Upon sensing an alert condition, four types of alarms are generated. Firstly, by showing a message in the display of the remote. Secondly, by generating a sound with sound generator 628 of the remote control unit. Thirdly, by generating a sound through an optional whistle chip sound generator in the boat itself. Fourthly, by flashing lights on the boat.

Testing Procedures
Results of Buoyancy Design Analysis

For a boat to float, it must weigh less than the volume of water displaced. Therefore the boat must be designed with consideration to the shape of the hull.

Figure 10B:
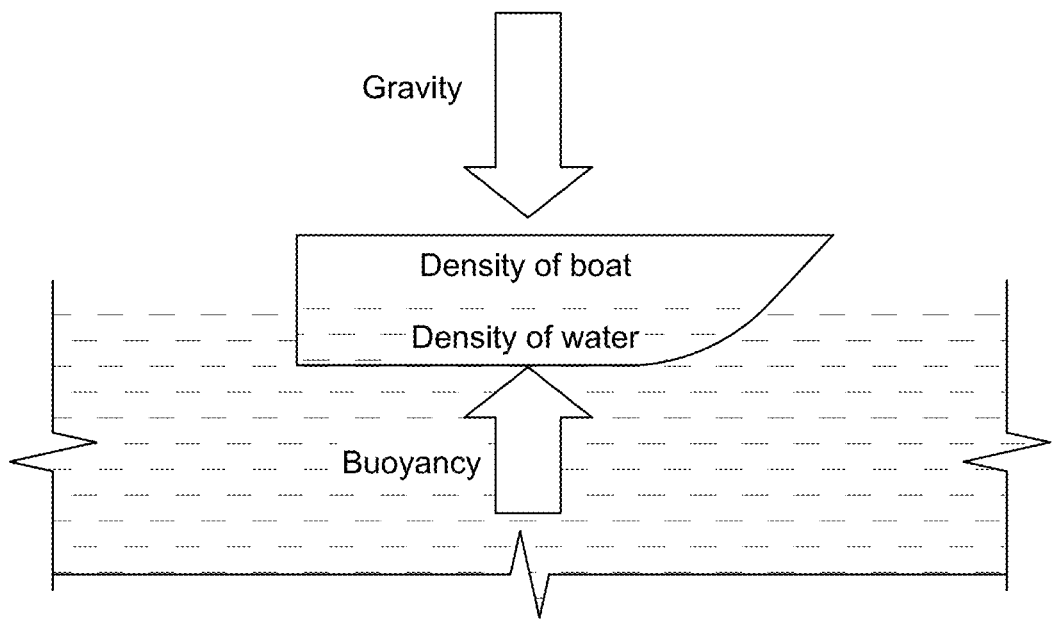
FIG. 10B depicts design parameters of the smart boat hull with respect to the buoyancy.
Figure 11:
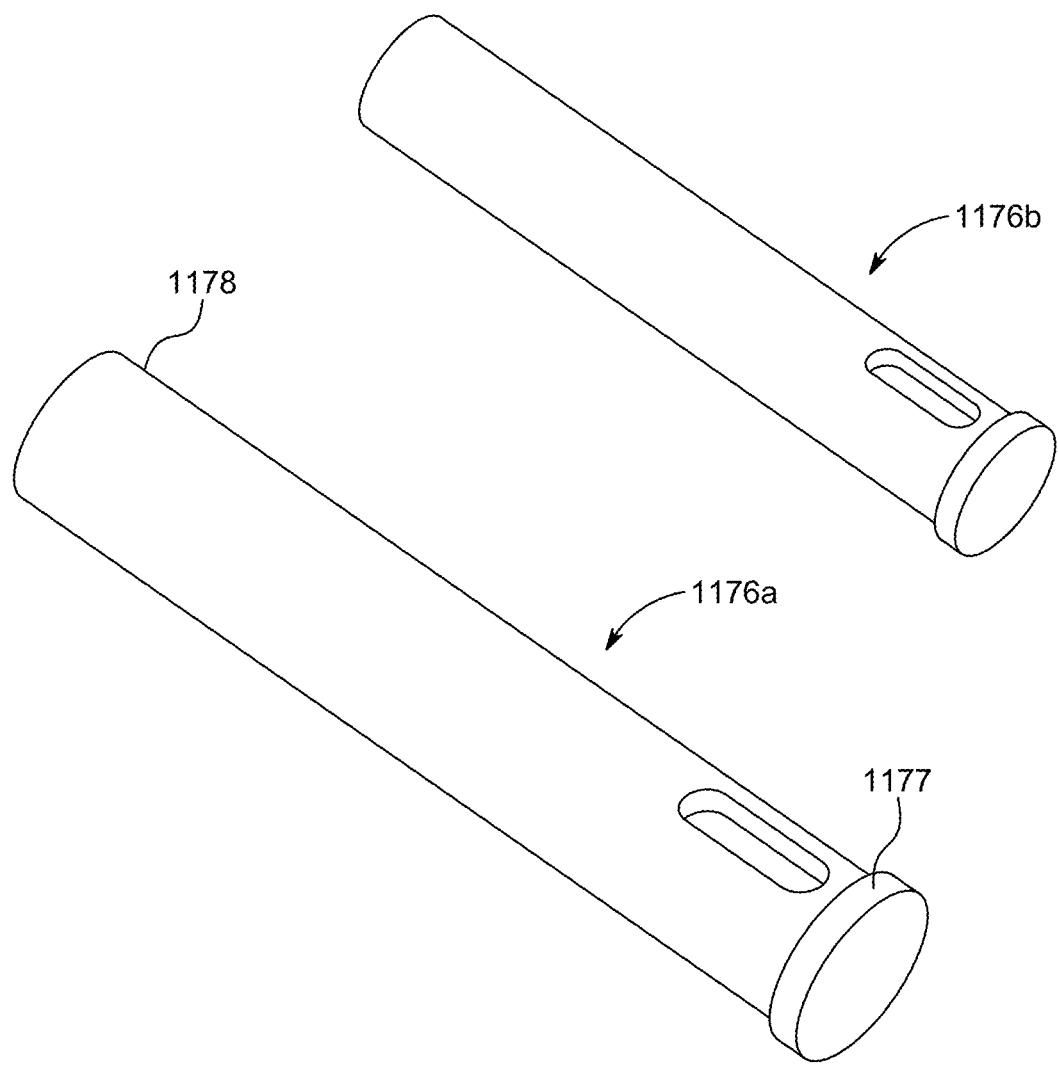
FIG. 11 depicts the net shaft.

In order to calculate the buoyancy force, the boat weight is considered in the calculations. The result must show that the buoyancy force is larger than the force due to gravity, Fb>Fg, so that the boat will be floating safely as shown in FIG. 10B.

Helical Gear Mesh Factors

Figure 9:
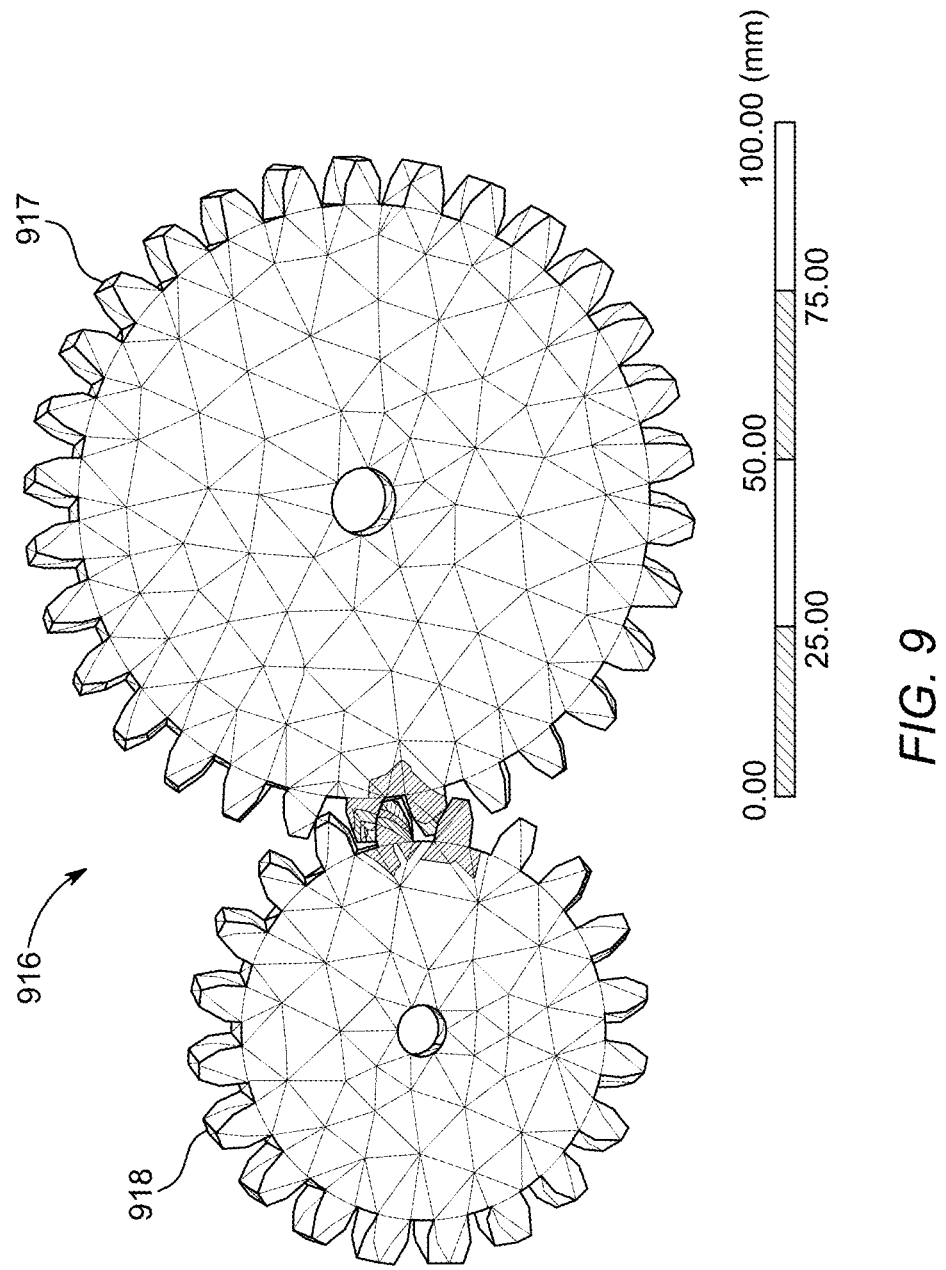
FIG. 9 is an exemplary table and diagram of the stress on the helical gears which lift the net, according to certain embodiments.

Using computer aided design analysis, helical gears stresses are designed around a factor of safety. The helical gears 916 shown in FIG. 9 are constructed of, for example, grey cast iron. The yield stress of grey cast iron is 130 Mpa. FIG. 9 shows a primary result where the maximum stress is 62.33 MPa. The factor of safety equals 130/62.335=2.08 which is an acceptable factor.

Design of Mechanical Components

Calculations for mechanical components were made, by using software such as Ansys, Analytix and MitCalc on slider-crank, helical and worm gears. The smart boat has been designed and drawn using SolidWorks.

Process Sheet

The manufacturing process for each part of the boat is shown in Table. 1. As shown below, a combination of machinery and CNC machines were used to make the parts.

The electronics are located as shown in FIG. 5 and are covered by isolation to protect it from water. The isolation can be any waterproof epoxy or resin.

The controller includes a control circuit as shown in FIG. 26, which includes six relays (RL-1 to RL-6), two capacitors (C1, C2) and a microcontroller. The microcontroller is a programmable chip that connects to the circuit. It contains three major ports, A, B, C (not shown). Every port has several connection points. Port C is designed for wireless receivers. Port A is used for logic and analog data for measuring pH and chlorine, while port B and port C are used for logic type of data only. There are six relays in the electrical circuit, two relays RL-3, RL-5 for each of motors 612b, 612c to control by the direction of rotation clockwise or anticlockwise. The two relays cannot work at the same time. Therefore, the first relay RL-3 actuates the motor 612b to operate clockwise while the second relay RL-5 actuates the motor to operate counterclockwise. The degree and the time of rotation is programmable. In addition, the motors 612b, 612c and the screen panels circuits (shown as having relays RL-2 and RL-4) each have a capacitor (C1, C2) of 1 nF to prevent motor shock as direction is changed. The slider crank mechanisms each have a motor (612d, 612e) and an associated relay (RL-1, RL-6) to open the gates. When the gates are fully opened and all chemicals are dispensed, the

TABLE 1

Manufacturing List of Smart Boat Parts

| PART | QUANTITY | MATERIAL | PROCESS NUMBER | PROCESS | MACHINE TYPE |
|---|---|---|---|---|---|
| HULL | 1 | Aluminum | 1 | Cutting | Lathe |
|  |  |  | 2 | Drilling | Drill Press |
| NET SHAFT | 2 | Aluminum | 1 | Turning | Lathe |
| SCREEN PANEL | 1 | Polylactic Acid | 1 | Cutting | Saw |
|  |  |  | 2 | Drilling | Drill Press |
| PROPELLER | 1 | Polymer | 1 | Cutting | CNC |
|  |  |  | 2 | Drilling | CNC |
| SLIDER GATE | 2 | Polylactic Acid | 1 | Slot cutting | Milling |
|  |  |  | 2 | Cutting | Saw |
| SLIDER BASE | 2 | Polylactic Acid | 1 | Path Cutting | Milling |
|  |  |  | 2 | Cutting | Saw |
| RUDDER ARM | 2 | Aluminum | 1 | Cutting | Saw |
|  |  |  | 2 | Drilling | Drill Press |
| RUDDER JOINT | 2 | Aluminum | 1 | Cutting | Saw |
|  |  |  | 2 | Drilling | Drill Press |
|  |  |  | 3 | Slot cutting | Saw |
| STEERING ROD | 2 | Aluminum | 1 | Turning | Lathe |
|  |  |  | 2 | Bending | Bar Bending |
| HELICAL GEARS | 4 (2 large, 2 small) | Grey Cast Iron | 1 | Tooth Cutting | Milling |
|  |  |  | 2 | Shaft Hole | Drill Press |
| SLIDER ROD | 2 | Polylactic Acid | 1 | Cutting | Saw |
|  |  |  | 2 | Turning | Lathe |
| SLIDER CRANK ROD | 2 | Polylactic Acid | 1 | Cutting | Saw |
|  |  |  | 2 | Drilling | Drill Press |
| RUDDER PIN | 2 | Aluminum | 1 | Turning | Lathe |
| WORM GEAR | 1 | Grey Cast Iron | 1 | Threading | CNC |
|  |  |  | 2 | Drilling | CNC |
|  |  |  | 3 | Milling | CNC |
| TOP COVER | 1 | Polymer | 1 | Milling | CNC |
| ELECTRONICS COVER | 1 | Polymer | 1 | Milling | CNC |
|  |  |  | 2 | Drilling | CNC | smart boat is taken out of the swimming pool by the user and the slider gate reservoirs are refilled or new cartridges are inserted.

The controller of the present disclosure may further include a computing device having hardware and software configured to accomplish the controlling described above.

Figure 27:
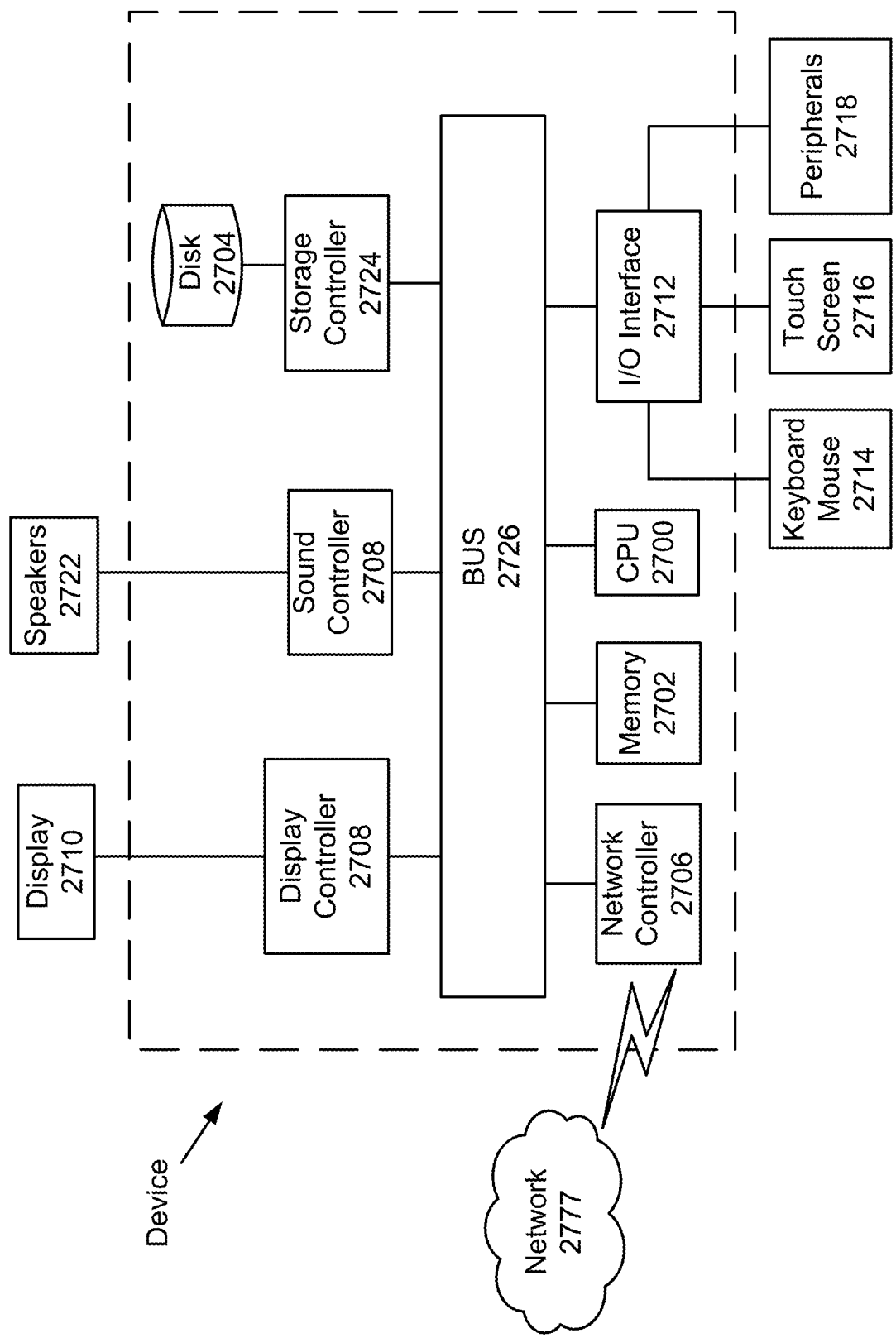
FIG. 27 is an exemplary schematic diagram of the computing device used in the control module, according to certain embodiments.

Next, a hardware description of a computing device according to exemplary embodiments is described with reference to FIG. 27. In FIG. 27, the computing device includes a CPU 2700 which performs the processes described above/below. The process data and instructions may be stored in memory 2702. These processes and instructions may also be stored on a storage medium disk 2704 such as a hard drive (HDD) or portable storage medium or may be stored remotely. Further, the invention is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the aspects of the invention may be provided as a utility application, background daemon, or component of an operating system, or combination thereof, executing in conjunction with CPU 2700 and an operating system such as Microsoft Windows 7, UNI7, Solaris, LINU7, Apple MAC-OS and other systems known to those skilled in the art. The hardware elements in order to achieve the computing device may be realized by various circuitry elements, known to those skilled in the art. For example, CPU 2700 may be a Xenon or Core processor from Intel of America or an Opteron processor from AMD of America, or may be other processor types that would be recognized by one of ordinary skill in the art. Alternatively, the CPU 2700 may be implemented on an FPGA, ASIC, PLD or using discrete logic circuits, as one of ordinary skill in the art would recognize. Further, CPU 2700 may be implemented as multiple processors cooperatively working in parallel to perform the instructions of the inventive processes described above.

The computing device in FIG. 27 also includes a network controller 2706, such as an Intel Ethernet PRO network interface card from Intel Corporation of America, for interfacing with network 2777. As can be appreciated, the network 2777 can be a public network, such as the Internet, or a private network such as an LAN or WAN network, or any combination thereof and can also include PSTN or ISDN sub-networks. The network 2777 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2708, such as a NVIDIA GeForce GT7 or Quadro graphics adaptor from NVIDIA Corporation of America for interfacing with display 2710, such as a Hewlett Packard HPL2445w LCD monitor. A general purpose I/O interface 2712 interfaces with a keyboard and/or mouse 2714 as well as a touch screen panel 2716 on or separate from display 2710. General purpose I/O interface also connects to a variety of peripherals 2718 including printers and scanners, such as an OfficeJet or DeskJet from Hewlett Packard.

A sound controller 2720 is also provided in the computing device such as Sound Blaster 7-Fi Titanium from Creative, to interface with speakers/microphone 2722 thereby providing sounds and/or music.

The general purpose storage controller 2724 connects the storage medium disk 2704 with communication bus 2726, which may be an ISA, EISA, VESA, PCI, or similar, for interconnecting all of the components of the computing device. A description of the general features and functionality of the display 2710, keyboard and/or mouse 2714, as well as the display controller 2708, storage controller 2724, network controller 2706, sound controller 2720, and general purpose I/O interface 2712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 28.

Figure 28:
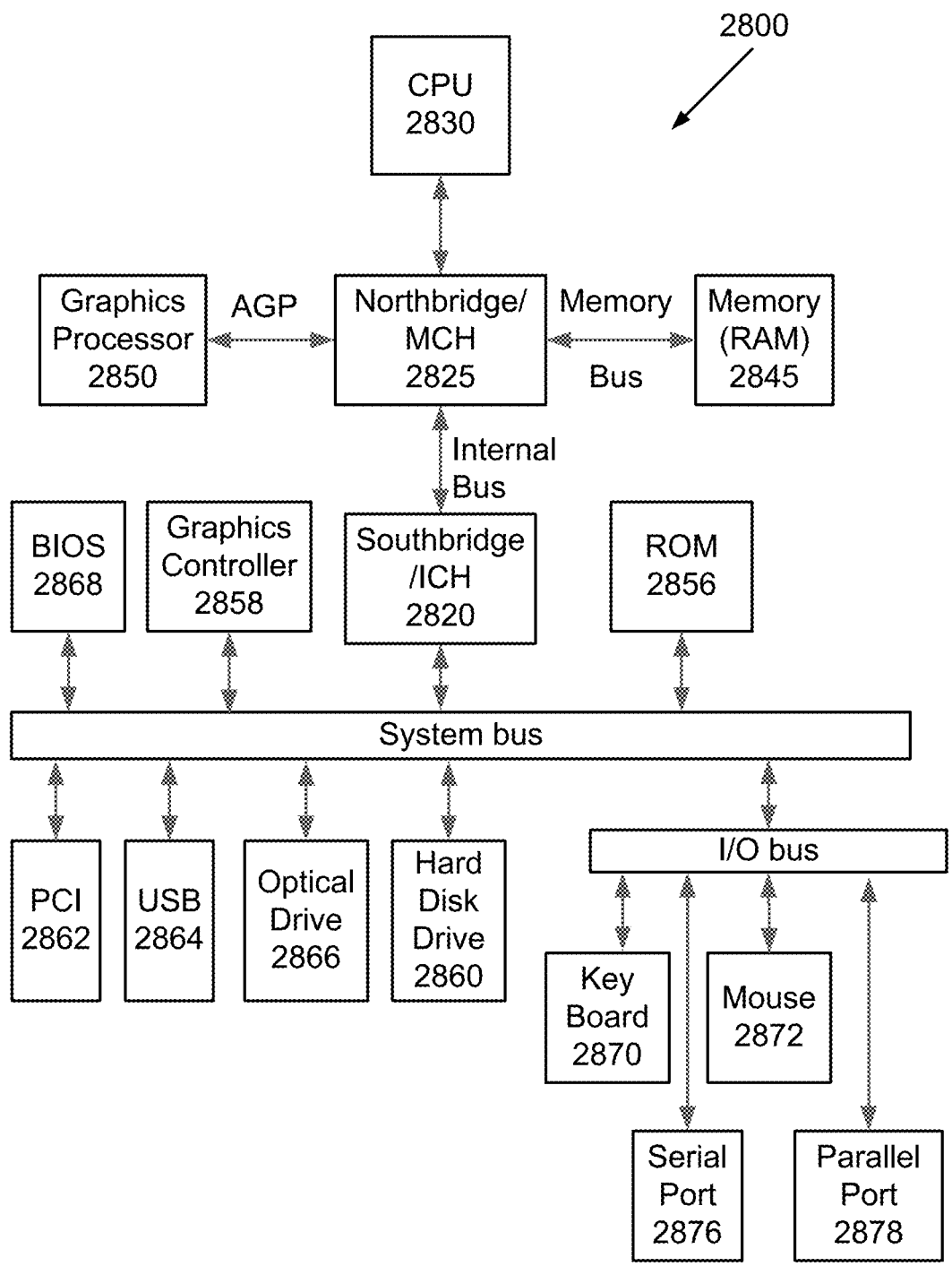
FIG. 28 is an exemplary schematic diagram of a data processing system, according to certain embodiments.

FIG. 28 shows a schematic diagram of a data processing system, according to certain embodiments, for performing the functions of the exemplary embodiments. The data processing system is an example of a computer in which code or instructions implementing the processes of the illustrative embodiments may be located.

In FIG. 28, data processing system 2800 employs a hub architecture including a north bridge and memory controller hub (NB/MCH) 2825 and a south bridge and input/output (I/O) controller hub (SB/ICH) 2820. The central processing unit (CPU) 2830 is connected to NB/MCH 2825. The NB/MCH 2825 also connects to the memory 2845 via a memory bus, and connects to the graphics processor 2850 via an accelerated graphics port (AGP). The NB/MCH 2825 also connects to the SB/ICH 2820 via an internal bus (e.g., a unified media interface or a direct media interface). The CPU Processing unit 2830 may contain one or more processors and even may be implemented using one or more heterogeneous processor systems.

Figure 29:
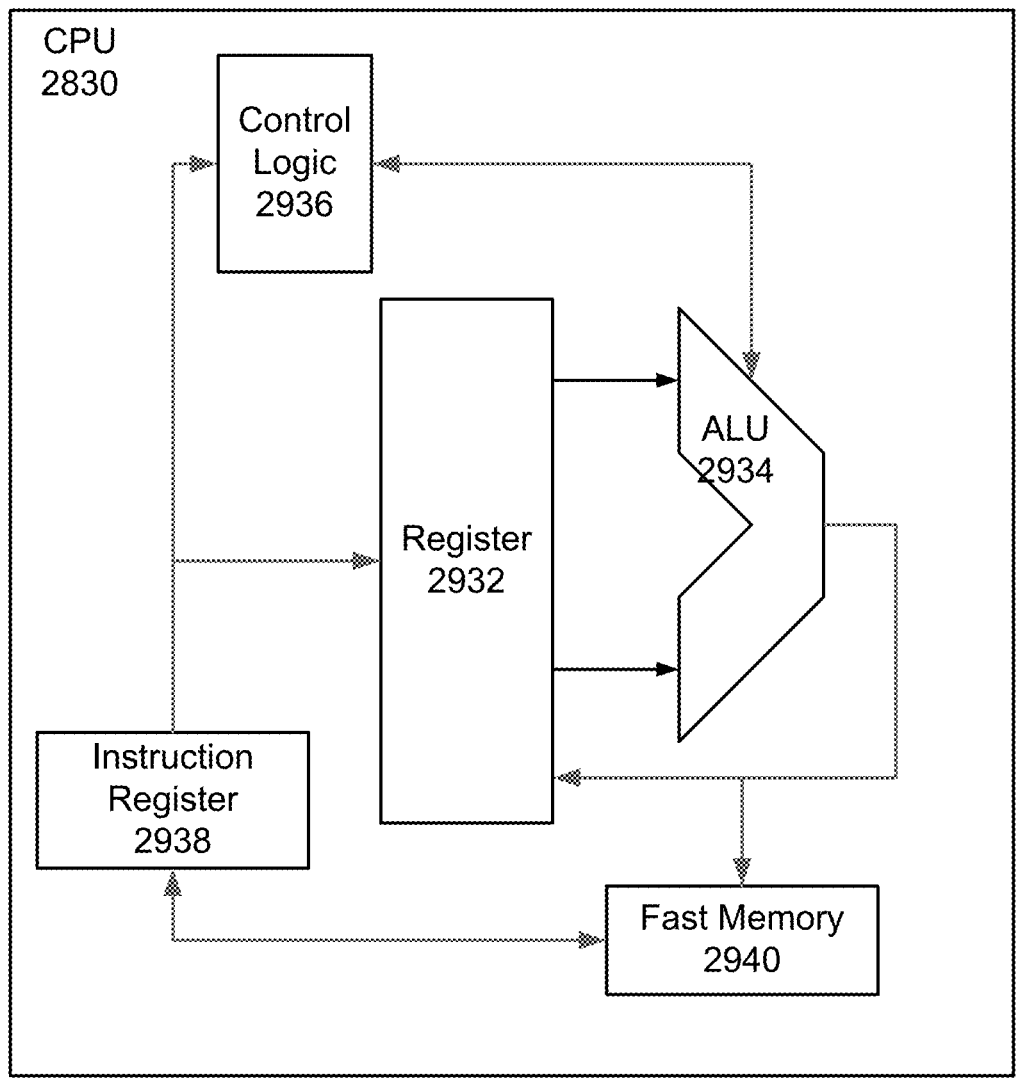
FIG. 29 is an exemplary schematic diagram of a processor, according to certain embodiments.

For example, FIG. 29 shows one implementation of CPU 2830. In one implementation, the instruction register 2938 retrieves instructions from the fast memory 2940. At least part of these instructions are fetched from the instruction register 9328 by the control logic 2936 and interpreted according to the instruction set architecture of the CPU 2830. Part of the instructions can also be directed to the register 2932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2934 that loads values from the register 2932 and performs logical and mathematical operations on the loaded values according to the instructions. The results from these operations can be feedback into the register and/or stored in the fast memory 2940. According to certain implementations, the instruction set architecture of the CPU 2830 can use a reduced instruction set architecture, a complex instruction set architecture, a vector processor architecture, a very large instruction word architecture. Furthermore, the CPU 2830 can be based on the Von Neuman model or the Harvard model. The CPU 2830 can be a digital signal processor, an FPGA, an ASIC, a PLA, a PLD, or a CPLD. Further, the CPU 2830 can be an x286 processor by Intel or by AMD; an ARM processor, a Power architecture processor by, e.g., IBM; a SPARC architecture processor by Sun Microsystems or by Oracle; or other known CPU architecture.

Referring again to FIG. 28, the data processing system 2800 can include that the SB/ICH 2820 is coupled through a system bus to an I/O Bus, a read only memory (ROM) 2856, universal serial bus (USB) port 2864, a flash binary input/output system (BIOS) 2868, and a graphics controller 2858. PCI/PCIe devices can also be coupled to SB/ICH 2888 through a PCI bus 2862.

The PCI devices may include, for example, Ethernet adapters, add-in cards, and PC cards for notebook computers. The Hard disk drive 2860 and CD-ROM 2866 can use, for example, an integrated drive electronics (IDE) or serial advanced technology attachment (SATA) interface. In one implementation the I/O bus can include a super I/O (SIO) device. Further, the hard disk drive (HDD) 2860 and optical drive 2866 can also be coupled to the SB/ICH 2820 through a system bus. In one implementation, a keyboard 2870, a mouse 2872, a parallel port 2878, and a serial port 2876 can be connected to the system bus through the I/O bus. Other peripherals and devices that can be connected to the SB/ICH 2820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A smart boat for swimming pool maintenance and water safety, comprising:
a hull having bottom, front, rear, first side and second side and a central axis extending from the front side to the rear side;
a propeller located at the rear of the hull;
a first rudder located at the rear of the hull near the first side;
a second rudder located at the rear of the hull near the second side;
a first sliding gate, located on the first side of the hull, the first sliding gate including at least one reservoir of chlorine;
a second sliding gate, located on the second side of the hull, the second sliding gate including at least one reservoir of acid;
a first slider-crank mechanism located on the first side of the hull and operatively connected to the first sliding gate;
a second slider-crank mechanism located on the second side of the hull and operatively connected to the second sliding gate;
a screen panel located at the front of the hull, wherein the screen panel is connected to helical gears which raise or lower the screen panel;
a plurality of motors, wherein each of the propeller, the screen panel and the first and second slider-crank mechanisms is connected to at least one motor of the plurality of motors;
a vibration sensor located on the rear of the hull;
a chlorine sensor located at the front of the hull;
a pH sensor located at the front of the hull;
a rechargeable battery;
at least one lighting unit;
a communications unit located within the hull;
a controller located in the hull, the controller operatively connected to the motors, the battery, the lighting unit and the communications unit; and
wherein the controller is further operatively connected to receive measurement signals from the vibration sensor, the chlorine sensor and the pH sensor.

2. The smart boat of claim 1,
wherein the first slider-crank mechanism further comprises a first slider base and a first slider gate having four chlorine reservoirs, each chlorine reservoir configured to hold a quantity of a chlorine;
wherein the second slider-crank mechanism further comprises a second slider base and a second slider gate having four acid reservoirs, each acid reservoir configured to hold a quantity of acid;
wherein a first movement of the first slider gate towards the front of the hull releases a quantity of the chlorine from a first chlorine reservoir into the water;
wherein a first movement of the second slider gate towards the front of the hull releases a quantity of the acid from a first acid reservoir into the water.

3. The smart boat of claim 2,
wherein the first slider crank mechanism further comprises a first slider rod and a first slider crank rod,
wherein the first slider rod comprises a perpendicular pin at a first end configured for connecting to a slot in the first slider gate,
wherein the first slider rod comprises a pivot pin at a second end,
wherein the first slider crank rod comprises a first end configured for connecting to the pivot pin of the first slider rod,
wherein the first slider crank rod comprises a first shaft hole configured to connect to a shaft of a first motor of the plurality of motors;
wherein the second slider crank mechanism further comprises a second slider rod and a second slider crank rod,
wherein the second slider rod comprises a perpendicular pin at a first end configured for connecting to a second through hole in the second slider gate,
wherein the second slider rod comprises a pivot pin at a second end;
wherein the second slider crank rod comprises a first end configured for connecting to the pivot pin of the second slider rod,
wherein the second slider crank rod comprises a second shaft hole configured to connect to a shaft of a second motor of the plurality of motors.

4. The smart boat of claim 1, wherein a decorative fountain is located at the front of the hull, the decorative fountain connected to a tapered plenum attached to a water scoop located beneath the hull.

5. The smart boat of claim 1,
wherein the first rudder comprises a first rudder arm, a first rudder joint, a first rudder pin and a first steering rod, wherein first rudder arm and the first rudder joint are connected together, and the first steering rod is connected at a first end to the first rudder arm by the first rudder pin and at a second end to a third motor;
wherein the second rudder comprises a second rudder arm, a second rudder joint, a second rudder pin and a second steering rod, wherein second rudder arm and the second rudder joint are connected together, and the second steering rod is connected at a first end to the second rudder arm by the second rudder pin and at a second end to the third motor;
wherein the fourth motor is connected through a first relay to the shaft of the propeller and the fifth motor is connected through a second relay to the shaft of the propeller.

6. The smart boat of claim 5, wherein the screen panel further comprises:
a boat net, a first net shaft and a second net shaft, gears, wherein the gears comprise a first and second turning pinion gear, a first and second lifting pinion gear, a worm gear, a worm gear turning shaft, the worm turning gear shaft having a first end, a second end and a center;
wherein the first end of the first net shaft is connected to a first side of the boat net and the second end of the first net shaft is connected to the first lifting pinion;
wherein the worm gear is operatively connected to the center of the worm gear turning shaft;
wherein the first end of the second net shaft is connected to a second side of the boat net, the second side of the boat net opposing the first side of the boat net, and wherein the second end of the second net shaft is connected to the second lifting pinion;
wherein the first side of the worm gear turning shaft is further connected to the first turning pinion;
wherein the second side of the worm gear turning shaft is further connected to the second turning pinion;
wherein the worm gear is operatively connected to a fourth and fifth motor of the plurality of motors;
wherein the first turning pinion gear and the first lifting pinion gear intermesh to provide raising of the screen panel when the fourth motor turns the worm gear in a first direction; and
wherein the second turning pinion gear and the second lifting pinion gear intermesh to provide lowering of the screen panel when the fifth motor turns the worm gear in a second direction opposite the first direction.

7. The smart boat of claim 1, further comprising an electronics cover and a top cover;
wherein the electronics cover is placed over the motors, communication unit, battery and controller;
wherein the electronics cover is hermetically sealed to protect the motors, communication unit, battery and controller;
wherein the top cover is connected to a framework on the first and second sides of the hull, and is located above the electronics cover;
wherein the top cover is transparent and comprises a plurality of solar cells on an underside of the cover,
wherein the solar cells are configured to generate electricity from rays of the sun impinging on the cover;
wherein the top cover is electrically connected to the battery; and
wherein the battery is configured to be recharged by electricity generated by the solar cells.

8. The smart boat of claim 1, further comprising a remote control unit,
wherein the remote control unit is operatively connected to receive communications from the communication unit and to transmit control signals to the communication unit;
wherein the remote control unit includes a display;
wherein the display is configured to display first alerts regarding swimming pool chemical status and second alerts regarding the motions of a body in the swimming pool;
wherein the display includes a user interface, wherein the user interface is configured to receive user input regarding the first and second alerts, and to transmit first and second control signals to the communication unit based on the user input.

9. The smart boat of claim 8, wherein the controller is further configured to operate the motors to actuate the propeller to propel the boat, move the rudders to steer the boat, turn the worm gear to lift the screen panel and actuate the first and second slider-crank mechanisms based upon control signals received from the remote control unit.

10. The smart boat of claim 1, wherein the vibration sensor, the chlorine sensor and the pH sensor are configured to transmit measurement signals to the controller, and wherein the controller has circuitry configured to receive the measurement signals, process the measurement signals to determine an alert status, and control the communications unit to transmit the alert status to the remote control.

11. The smart boat of claim 10, the controller further comprising a sound generator,
wherein the sound generator produces a whistling noise when an alert status is determined; and
the controller further actuates the lighting unit to flash lights when the alert status is determined.

12. A method for controlling a smart boat for swimming pool maintenance and water safety, the swimming pool containing a volume of water, comprising:
a steering process, including:
receiving, at a communication unit operatively coupled to a controller, a forward navigation control signal from a remote control unit;
actuating, by the controller, a first motor coupled to a propeller, wherein the actuation of the first motor rotates the propeller in a clockwise direction causing the smart boat to move forward;
receiving, at the communication unit, a reverse navigation control signal from the remote control unit;
actuating, by the controller, a second motor coupled to the propeller, wherein the actuation of the second motor rotates the propeller in a counterclockwise direction causing the smart boat to move backwards;
receiving, at the communication unit, a rudder control signal from the remote control unit;
actuating, by the controller, a third motor, causing at least one rudder to move to a first side or to a second side, wherein movement of the rudder causes the smart boat to move in a leftwards direction or in a rightwards direction;
a chemical maintenance process, including:
measuring, by a chlorine sensor, the quantity of chlorine in the swimming pool water; and
actuating, by the controller, a fourth motor to release a quantity of chlorine into the water.

13. The method for controlling the smart boat of claim 12, the chemical maintenance process further including:
receiving, by a controller operatively connected to the chlorine sensor, the measurement of the quantity of chlorine;

processing, by the controller, the measurement of the quantity of chlorine to determine whether the quantity of chlorine is below a chlorine threshold level;

transmitting, by the communication unit, a chlorine alert signal to the remote control unit when the quantity of chlorine is below the chlorine threshold level;

displaying, on a display of the remote control unit, the chlorine alert;

receiving, at a user interface of the remote control unit, a user input related to the alert and generating a chlorine control signal;

transmitting the chlorine control signal to the communications unit of the controller;

receiving, by the controller, the chlorine control signal;

actuating a first slider-crank mechanism by the fourth motor, the first slider-crank mechanism further operatively connected to a first sliding gate having a plurality of chlorine reservoirs, wherein actuating the fourth motor causes the first slider-crank mechanism to open the first sliding gate and release the quantity of chlorine into the water;

measuring, by an acid sensor, the quantity of acid in the swimming pool water;

receiving, by the controller which is operatively connected to the acid sensor, the measurement of the quantity of acid;

processing, by the controller, the measurement of the quantity of acid to determine whether the quantity of acid is below an acid threshold level;

transmitting, by the communication unit, an acid alert signal to the remote control unit when the quantity of acid is below the acid threshold level;

displaying, on a display of the remote control unit, the acid alert;

receiving, at a user interface of the remote control unit, a user input related to the acid alert and generating an acid control signal;

transmitting the acid control signal to the communications unit of the controller;

receiving, by the controller, the acid control signal;

actuating, by the controller, a fifth motor operatively connected to a second slider-crank mechanism, the second slider-crank mechanism further operatively connected to a second sliding gate having a plurality of acid reservoirs, wherein actuating the fifth motor causes the second slider-crank mechanism to move the second sliding gate to release a quantity of acid into the water.

14. The method for controlling the smart boat of claim 12, further comprising:

a water safety process, including:

measuring, by a turbulence sensor within the smart boat, vibrations caused by turbulence of the water in the swimming pool, wherein high turbulence indicates that a body has entered the swimming pool;

receiving, by the controller which is operatively connected to the turbulence sensor, measurements of the vibrations;

processing, by the controller, the measurements of the vibrations to determine whether the vibrations are above a turbulence threshold level;

sounding, by a sound generator operatively connected to the controller, a whistle noise to alert at least one listener that a body has entered the swimming pool;

actuating, by the controller, a lighting unit on the smart boat, wherein actuating the lighting unit causes the lighting unit to flash lights;

transmitting, by the communication unit, a turbulence alert to the remote control unit when the vibrations are above the turbulence threshold level;

displaying the turbulence alert on the remote control display;

sounding an alarm, by a sound generator within the remote control unit, to notify at least one user that a body has entered the swimming pool.

15. The method for controlling the smart boat of claim 12, further comprising:

a debris collection process, including:

receiving, at the user interface of the remote control unit, a user input regarding operation of a screen panel of the smart boat;

transmitting, by the remote control unit, a screen panel control signal to the communications unit of the smart boat;

receiving, by the communication unit, the screen panel control signal;

actuating at least one of a first relay connected to the first motor to raise the screen and a second relay connected to the second motor to lower the screen panel, based on the screen panel control signal.

16. The method for controlling the smart boat of claim 12, further comprising:

a power generation process, including:

connecting a top cover to the smart boat, wherein the top cover is transparent and comprises a plurality of solar cells on an underside of the top cover, generating, with the solar cells, electricity from rays of the sun impinging on the cover; electrically connecting the top cover to the battery; and recharging the battery by the electricity generated by the solar cells.

17. The method for controlling the smart boat of claim 12, further comprising:

connecting a decorative fountain to the front of the smart boat, the decorative fountain having a tapered plenum attached to a water scoop located beneath the smart boat;

operating the first motor to cause the boat to move forward;

scooping water by the water scoop as a result of the forward motion;

compressing the water through the tapered plenum;

generating a fountain of water due to the compressing.

18. A system for swimming pool maintenance and water safety, comprising:

a smart boat, wherein the smart boat includes a propulsion system, a steering system, at least one chemical sensing system including at least one chemical sensor, a water turbulence measuring system including a water turbulence sensor, a chemical replenishing system, a debris collection system, a controller having processing circuitry and a communication unit;

a remote control unit for transmitting control signals to the communication unit to actuate the propulsion system, steer the smart boat, replenish chemicals and operate the debris collection system;

wherein the controller receives chemical measurement signals from the at least one chemical sensor regarding a level of chemical in the swimming pool water, processes the signals, compares the chemical measurement signals to a threshold level, and transmits, by the communication unit, an alert to the remote control unit when the level of chemical is below a chemical threshold level;

wherein the remote control unit receives the alert, displays the alert upon a display operatively connected to the remote control unit and sounds an alarm to notify a user of the alert;

wherein the remote control unit further comprises a user interface to receive a user input regarding the alert, generates a control signal based on the user input and transmits the control signal to the communication unit;

wherein the controller receives the control signal from the communication unit and transmits at least one actuation signal to replenish the chemical;

wherein the controller further receives water turbulence measurement signals from the water turbulence sensor regarding the turbulence in the swimming pool water, processes the water turbulence measurement signals, compares the water turbulence measurement signals to a threshold level, and transmits, by the communication unit, an safety alert to the remote control unit when the water turbulence measurement is above a water turbulence threshold level;

wherein the remote control unit receives the safety alert, displays the safety alert upon a display operatively connected to the remote control unit and sounds an alarm to notify a user of the safety alert.

19. The system of claim 18, wherein the user interface of the remote control further comprises buttons for generating control signals to propel the boat forward, propel the boat backwards, steer the boat to the left or right, raise or lower a screen panel of the debris collection system and release chemicals.

* * * * *